United States Patent
Nakata

(10) Patent No.: US 11,343,401 B2
(45) Date of Patent: May 24, 2022

(54) INFORMATION PROCESSING DEVICE AND CONTROL METHOD TO ACQUIRE AND EXECUTE A WORKFLOW INCLUDING INTERRELATED JOBS

(71) Applicant: Konica Minolta, Inc., Tokyo (JP)

(72) Inventor: Masaki Nakata, Toyohashi (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 17/227,941

(22) Filed: Apr. 12, 2021

(65) Prior Publication Data

US 2021/0352187 A1    Nov. 11, 2021

(30) Foreign Application Priority Data

May 11, 2020  (JP) .............................. JP2020-083095

(51) Int. Cl.
    *H04N 1/00*        (2006.01)
    *H04N 1/32*        (2006.01)
    *H04N 1/34*        (2006.01)

(52) U.S. Cl.
    CPC ....... *H04N 1/00954* (2013.01); *H04N 1/0097* (2013.01); *H04N 1/00244* (2013.01); *H04N 1/00474* (2013.01); *H04N 1/00949* (2013.01); *H04N 1/32587* (2013.01); *H04N 1/344* (2013.01); *H04N 1/32545* (2013.01); *H04N 2201/0094* (2013.01)

(58) Field of Classification Search
    CPC ........... H04N 1/00954; H04N 1/00244; H04N 1/00474; H04N 1/00949; H04N 1/0097; H04N 1/32587; H04N 1/344; H04N 1/32545; H04N 2201/0094
    See application file for complete search history.

(56) References Cited

U.S. PATENT DOCUMENTS

2019/0278630 A1*  9/2019  Kuroyanagi ....... H04N 1/00949
2021/0075924 A1*  3/2021  Hirano .................. G06F 3/1205

FOREIGN PATENT DOCUMENTS

| JP | 2007-088663 A | 4/2007 |
| JP | 2016-210138 A | 12/2016 |
| JP | 2019-059135 A | 4/2019 |

* cited by examiner

Primary Examiner — Nicholas Pachol
(74) Attorney, Agent, or Firm — Osha Bergman Watanabe & Burton LLP

(57) ABSTRACT

An information processing device acquires and executes a workflow including interrelated jobs from a management device. The information processing device includes: a main controller including a memory that stores instructions and a central processing unit (CPU) that executes the instructions; and an operation panel. Based on the instructions executed by the CPU, the main controller: determines whether the first network region matches the second network region, determines whether the workflow includes a first cloud job that requests a service from a server device, upon determining that the first network region does not match the second network region and also that the workflow includes the first cloud job, determines whether to implement the service in the second network region, and upon determining not to implement the service in the second network region, outputs service information to be displayed as an alternative service.

22 Claims, 12 Drawing Sheets

FIG. 3A

| Number | Command name | Condition | Details | |
|---|---|---|---|---|
| 1 | Scan setting | | Settings: resolution, color setting | ~142a |
| 2 | E-mail transmission setting | | Settings: transmission destination | ~142b |
| 3 | Scan operation | | | ~142c |
| 4-1 | Translation processing | No. of scans: 10 or more | Connection destination: honyaku5.com/api1/ | ~142d |
| 4-1 | Translation processing | No. of scans: less than 10 | Connection destination: honyaku5.com/api2/ | ~142e |
| 5 | E-mail transmission operation | | | ~142f |

FIG. 3B

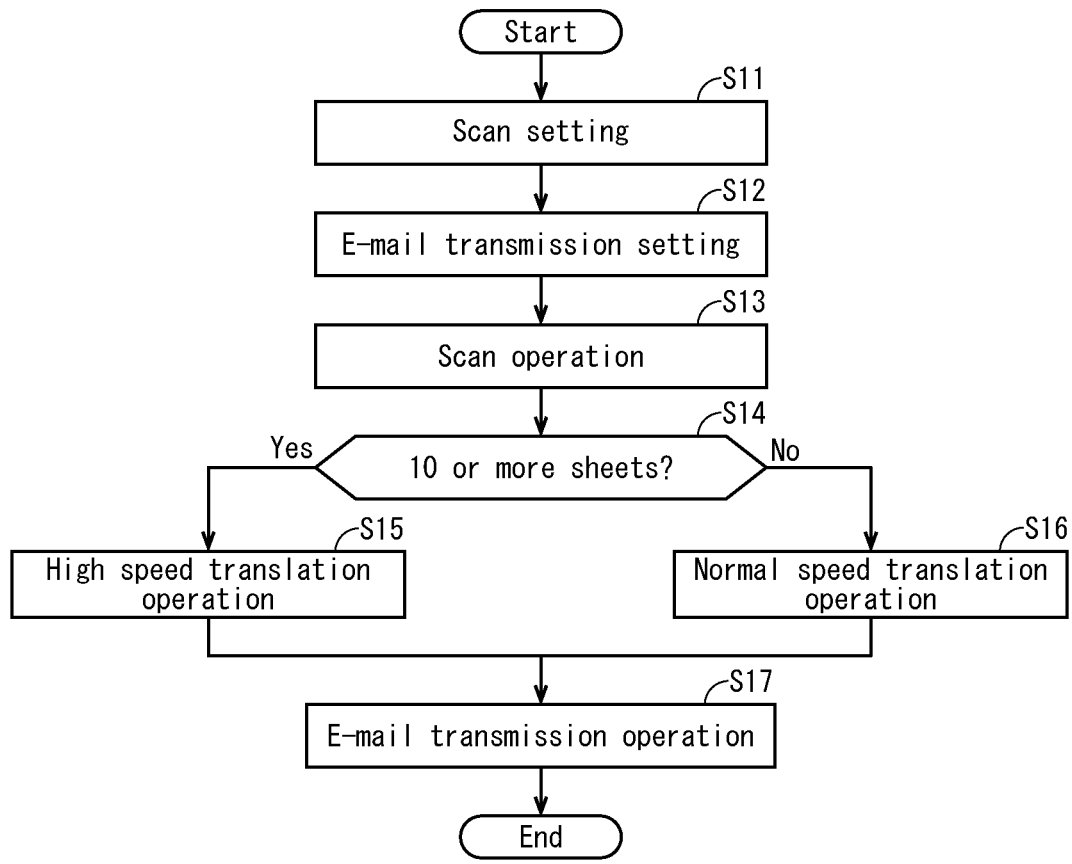

FIG. 4

Connection availability table 401

| Connection availability information | | | | | |
|---|---|---|---|---|---|
| Service URL | Connection availability | | | | |
| | US | EU | AP | JP | CN |
| example1.com | OK | OK | OK | OK | OK |
| example2.com | OK | OK | OK | OK | NG |
| example3.com | NG | OK | OK | OK | OK |

FIG. 5

Service list table 411

| Service information | |
|---|---|
| Category | Service URL |
| Translation | http://example1.com/api/translate/ |
| | http://example2.com/api/translate/ |
| OCR | http://example2.com/api/OCR/ |
| | http://example3.com/api/OCR/ |

FIG. 6

Usage fee table 421

| Usage information | | |
|---|---|---|
| Category | Service URL | Usage fee |
| Translation | http://example1.com/api/translate/ | 1 |
| | http://example2.com/api/translate/ | 2 |
| OCR | http://example2.com/api/OCR/ | 4 |
| | http://example3.com/api/OCR/ | 7 |

FIG. 7

Communication speed table 431

| Communication speed information | | |
|---|---|---|
| Category | Service URL | Communication speed |
| Translation | http://example1.com/api/translate/ | 50 |
| | http://example2.com/api/translate/ | 40 |
| OCR | http://example2.com/api/OCR/ | 20 |
| | http://example3.com/api/OCR/ | 10 |

FIG. 8

Supported languages table 441

| Category | Supported languages information | |
|---|---|---|
| | Service URL | Supported languages |
| Translation | http://example1.com/api/translate/ | en, ja, de |
| | http://example2.com/api/translate/ | en, ja, zh |

FIG. 9

Company information table 451

| Service URL | Company information | | |
|---|---|---|---|
| | Country | Year Est. | No. of countries |
| example1.com | U.S.A. | 1990 | 100 |
| example2.com | Japan | 2000 | 50 |
| example3.com | China | 2010 | 2 |

FIG. 10

User count table 461

| Service URL | User count information | |
|---|---|---|
| | Year | User count |
| example1.com | 2019 | 20,000 |
| example2.com | 2019 | 115,000 |
| example3.com | 2019 | 75,000 |

INFORMATION PROCESSING DEVICE AND CONTROL METHOD TO ACQUIRE AND EXECUTE A WORKFLOW INCLUDING INTERRELATED JOBS

CROSS-REFERENCE TO RELATED APPLICATIONS

This application claims priority to Japanese Patent Application No. 2020-083095 filed on May 11, 2020, the contents of which are incorporated herein by reference in their entirety.

BACKGROUND

Technical Field

The present disclosure relates to techniques for controlling execution of interrelated jobs as one workflow in an information processing device, including a job for requesting a service to a server device.

Description of the Related Art

Image forming devices such as multifunction peripherals (MFP) have a function of executing interrelated jobs as a series of jobs. Such a series of jobs can be referred to as a workflow (see JP 2019-59135).

For example, a job of scanning a document in an MFP to obtain image data, a job of transferring obtained image data to a cloud server, executing optical character recognition (OCR) processing to extract a character string from the image data on the cloud server, and returning the extracted character string to the MFP, and a job of sending the character string received from the cloud server to a specified destination by E-mail are executed by the MFP as one workflow.

The MFP can store workflow internally according to user operation. A user can execute a workflow by simply designating a stored workflow.

Further, according to a user operation, a first MFP can cause a workflow to be stored in a management server connected to the first MFP by a network. According to a user operation, a second MFP connected to the management server via the network can acquire the workflow from the management server and execute the acquired workflow.

For example, when a user who normally uses the first MFP installed in Tokyo travels to Fukuoka where the second MFP is installed, the user can operate the second MFP to acquire the workflow from the management server and execute the acquired workflow.

Content of a cloud service provided by a cloud server may differ for each network region constructed for each country or international area consisting of multiple countries (hereinafter also referred to as "country, etc.").

Thus, an execution result of a workflow acquired from a management server by a first MFP installed in Country A may be different from an execution result of a workflow acquired from a management server by a second MFP installed in Country B.

For example, in Country A, Company X is permitted to provide a translation service, but in Country B, Company X is not permitted to provide a translation service. In this case, if the workflow includes a job of requesting a translation service from Company X, the workflow cannot be executed in Country B.

As another example, in Country A, only Company X is permitted to provide a translation service, but in Country B, only Company Y is permitted to provide a translation service. In this case, if a workflow includes a translation service (whether Company X or Company Y), translation content as a result of executing the workflow in Country A or Country B may be different.

Further, for example, cloud service processing performance, usage fee, etc., may differ from country to country.

SUMMARY

One or more embodiments of the present invention provide an information processing device and control method that provides a practical, technological improvement for the situations described above, caused by service content provided by a server device differing for each network region, such that even if a first network region where a device that created a workflow is installed and a second network region where a device that executes the workflow is installed are different, an appropriate service can be provided in the second network region.

An information processing device according to one or more embodiments is an information processing device that acquires and executes a workflow including interrelated jobs from a management device, the information processing device comprising: a non-transitory memory device (i.e., memory) that stores instructions; and a hardware processor that executes the instructions and causes the information processing device to operate as: a first determination unit that determines whether a first network region in which a device that generated the workflow is installed matches a second network region in which the information processing device is installed; a second determination unit that determines whether the workflow includes a cloud job, which is a job that requests a service from a server device; a third determination unit that, when the first determination unit determines that the first network region and the second network region do not match and the second determination unit determines that the workflow includes a cloud job, determines whether implementing the service in the second network region is appropriate; and a presentation unit (i.e., operation panel) that, when the third determination unit determines that implementing the service is not appropriate, presents an alternative service.

BRIEF DESCRIPTION OF THE DRAWINGS

The advantages and features provided by one or more embodiments will become more fully understood from the detailed description given hereinbelow and the appended drawings which are given by way of illustration only, and thus are not intended as a definition of the limits of the invention. In the drawings:

FIG. 3A illustrates a workflow 141 as an example, and FIG. 3B is a flowchart illustrating operations in the workflow 141.

FIG. 4 illustrates a data structure of a connection availability table 401.

FIG. 5 illustrates a data structure of a service list table 411.

FIG. 6 illustrates a data structure of a usage fee table 421.

FIG. 7 illustrates a data structure of a communication speed table 431.

FIG. 8 illustrates a data structure of a supported language table 441.

FIG. 9 illustrates a data structure of a company information table 451.

FIG. 10 illustrates a data structure of a user count table 461.

DETAILED DESCRIPTION

1 Embodiments 1.1 Communication System 5

Figure 1:
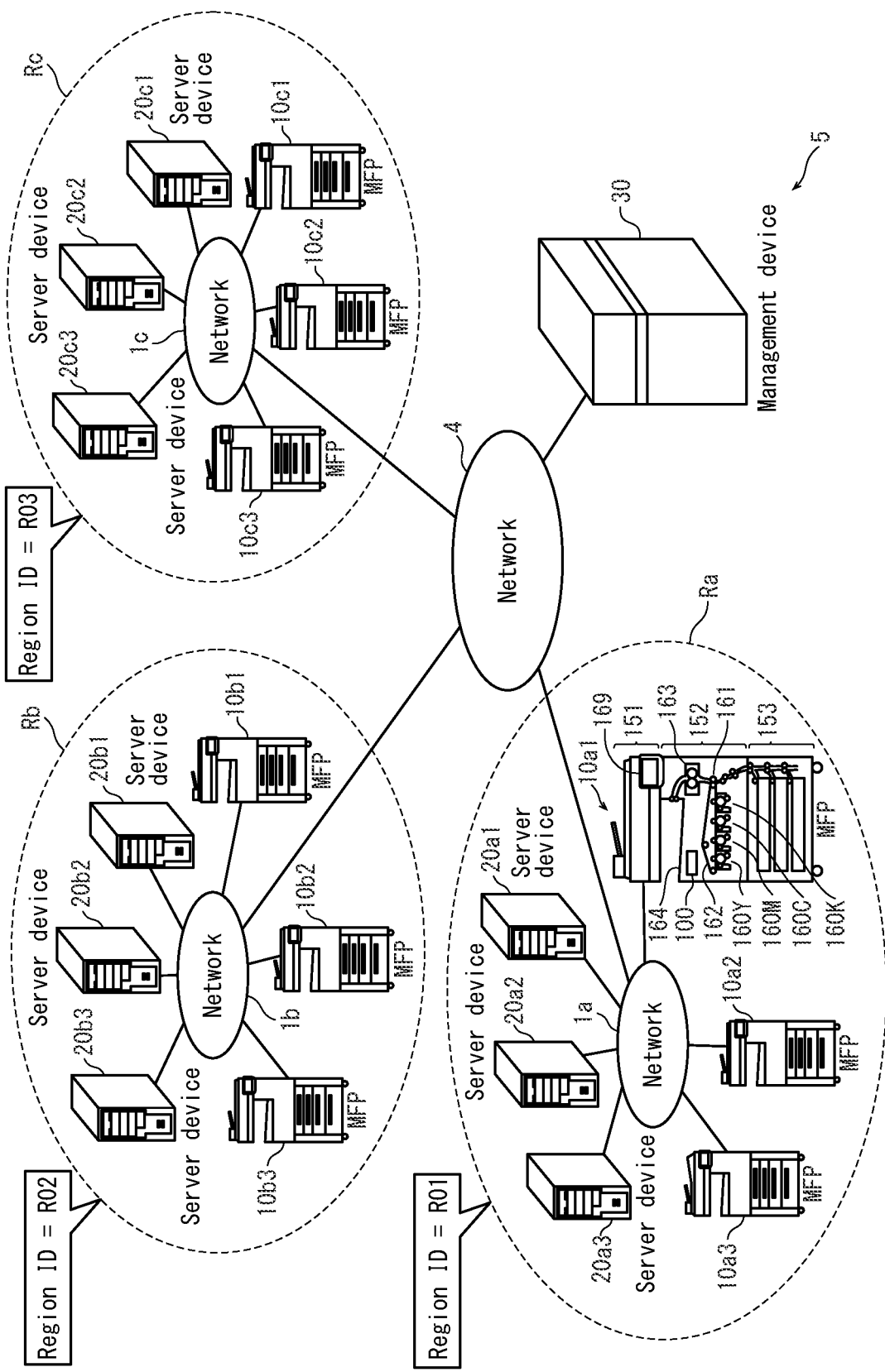
FIG. 1 illustrates structure of a communication system 5.

A communication system 5, as illustrated in FIG. 1, comprises multifunction peripherals (MFP) 10*a*1, 10*a*2, 10*a*3, server devices 20*a*1, 20*a*2, 20*a*3, MFPs 10*b*1, 10*b*2, 10*b*3, server devices 20*b*1, 20*b*2, 20*b*3, MFPs 10*c*1, 10*c*2, 10*c*3, server devices 20*c*1, 20*c*2, 20*c*3, and a management device 30.

One communication network is constructed for each country, etc. Multiple networks in different countries, etc., are connected to each other, and as a result one communication network is constructed on the earth as a whole. A range covered by one communication network constructed for a country, etc., is also called a network region or region. Each region is identified by a region identifier (ID).

The MFPs 10*a*1, 10*a*2, 10*a*3 and the server devices 20*a*1, 20*a*2, 20*a*3 are arranged in a network 1*a* (region A) identified by a region ID R01.

Further, the MFPs 10*b*1, 10*b*2, 10*b*3 and the server devices 20*b*1, 20*b*2, 20*b*3 are arranged in a network 1*b* (region B) identified by a region ID R02.

Further, the MFPs 10*c*1, 10*c*2, 10*c*3 and the server devices 20*c*1, 20*c*2, 20*c*3 are arranged in a network 1*c* (region C) identified by a region ID R03.

Further, the management device 30 is disposed in a different region to the regions A, B, and C. However, the management device 30 may be disposed in the region A, B, or C.

The network 1*a*, the network 1*b*, and the network 1*c* are connected to a network 4. The management device 30 is also connected to the network 4.

The server device 20*a*1 provides a translation service and an optical character recognition (OCR) service, for example, the server device 20*a*2 provides a translation service, for example, and the server device 20*a*3 provides an OCR service, for example. Further, the server device 20*b*1 provides a translation service and an OCR service, for example, the server device 20*b*2 provides a translation service, for example, and the server device 20*b*3 provides an OCR service, for example. The server device 20*c*1 provides a translation service and an OCR service, for example, the server device 20*c*2 provides a translation service, for example, and the server device 20*c*3 provides an OCR service, for example. These server devices may of course provide other services.

Connection destinations of any device on the network 1*a* are not restricted by the network 1*a*. Further, connection destinations of any device on the network 1*c* are not restricted by the network 1*c*.

Therefore, any MFP in the region A can be connected to any server device in the region A, and can be connected to any server device in the region C. The same is true for any MFP in the region C.

However, the network 1*b* restricts all devices in the network 1*b* from connecting outside the network 1*b*. Further, the network 1*b* restricts all devices outside the network 1*b* from connecting to the network 1*b*.

Therefore, any MFP in the region A cannot connect to any server device in the region B, and any MFP in the region C cannot connect to any server device in the region B.

Any MFP in the region B can connect to any server device in the region B. However, any MFP in the region B cannot connect to any server device in the region A, or any server device in the region C. An exception is that any MFP in the region B can connect to the management device 30.

The connection restrictions described above are just an example, and connection restrictions are not limited to this example.

1.2 MFP 10*a*1

Here, the MFP 10*a*1 is described as representative of the MFPs 10*a*1, 10*a*2, 10*a*3, 10*b*1, 10*b*2, 10*b*3, 10*c*1, 10*c*2, 10*c*3. The MFPs 10*a*2, 10*a*3, 10*b*1, 10*b*2, 10*b*3, 10*c*1, 10*c*2, 10*c*3 each have similar structure to the MFP 10*a*1, and description thereof is omitted.

The MFP 10*a*1 (information processing device), as illustrated in FIG. 1, is a tandem-type color MFP that has the functions of a scanner, printer, copier, and the like.

The MFP 10*a*l, as illustrated, includes a sheet feeder 153 at a bottom of a housing, for accommodating and feeding out sheets. Above the sheet feeder 153 is a printer 152 for forming images by an electrophotographic method. Above the printer 152 is an image reader 151 for reading documents to generate image data, and an operation panel 169 for displaying operation screens and receiving input operations from a user.

The image reader 151 includes an automatic document feeder (ADF). The ADF feeds documents set on a document tray one sheet at a time to a reading position via a conveyance path. The image reader 151 reads a document conveyed to the reading position by the ADF or reads a document placed on the document glass plate by a user via a moving scanner, in order to obtain image data comprising multi-value digital signals of red (R), green (G), and blue (B).

Image data of each color component obtained by the image reader 151 undergoes data processing by control circuitry 100 and is further converted to image data in reproduction colors of yellow (Y), magenta (M), cyan (C), and black (K).

The printer 152 includes an intermediate transfer belt 162 kept taut by a drive roller, a driven roller, and a backup roller, a secondary transfer roller 161, imaging units 160Y, 160M, 160C, 160K disposed at defined intervals along a travel direction of the intermediate transfer belt 162, a fixing unit 163, the control circuitry 100, and the like.

The imaging units 160Y, 160M, 160C, 160K each form a toner image of a corresponding color, Y, M, C, K. More specifically, each imaging unit includes a photoreceptor drum as an image carrier, a light-emitting diode (LED) array for exposure scanning of a surface of the photoreceptor drum, a charger, a developing unit, a cleaner, a primary transfer roller, and the like.

The sheet feeder 153 includes sheet cassettes that can accommodate sheets of different sizes, and pickup rollers for feeding sheets from the sheet cassettes to a conveyance path.

In each of the imaging units 160Y, 160M, 160C, 160K, the photoreceptor drum is uniformly charged by the charger and exposed by the LED array to form an electrostatic latent image on a surface of the photoreceptor drum. Each electrostatic latent image is developed by the developing unit of a corresponding color to form Y, M, C, K color toner images on the surfaces of the photoreceptor drums, and the toner images are transferred in order onto a front surface of the intermediate transfer belt 162 by electrostatic action of the primary transfer rollers disposed on a reverse side of the intermediate transfer belt 162.

Image forming timing of each color is staggered so that the Y, M, C, K toner images are transferred onto the intermediate transfer belt 162 at an overlapping position.

A sheet is fed from any of the sheet cassettes of the sheet feeder 153 in accordance with an imaging operation by the imaging units 160Y, 160M, 160C, 160K.

The sheet is conveyed on the conveyance path to a secondary transfer position where the secondary transfer roller 161 and the backup roller face each other across the intermediate transfer belt 162, and at the secondary transfer position, the overlapping Y, M, C, K color toner image is transferred onto the intermediate transfer belt 162 by electrostatic action of the secondary transfer roller 161. The sheet onto which the Y, M, C, K color toner image is transferred is further conveyed to the fixing unit 163.

The toner image on a surface of the sheet is fixed to the surface of the sheet by heat and pressure when passing through a fixing nip formed between a heating roller of the fixing unit 163 and a pressure roller of the fixing unit 163 pressed against the heating roller, and after passing through the fixing unit 163, the sheet is ejected onto an ejection tray 164.

The operation panel 169 is provided with a display composed of a liquid crystal display plate or the like, and displays content set by a user and various messages. Further, the operation panel 169 (presentation unit) presents alternative services as described later. The operation panel 169 (reception unit or receiver) receives instructions from a user to start copying, set a number of copies, set copy conditions, set data output destinations, select alternative services, etc., and notifies the control circuitry 100 of received content.

1.3 Control Circuitry 100

Figure 2:
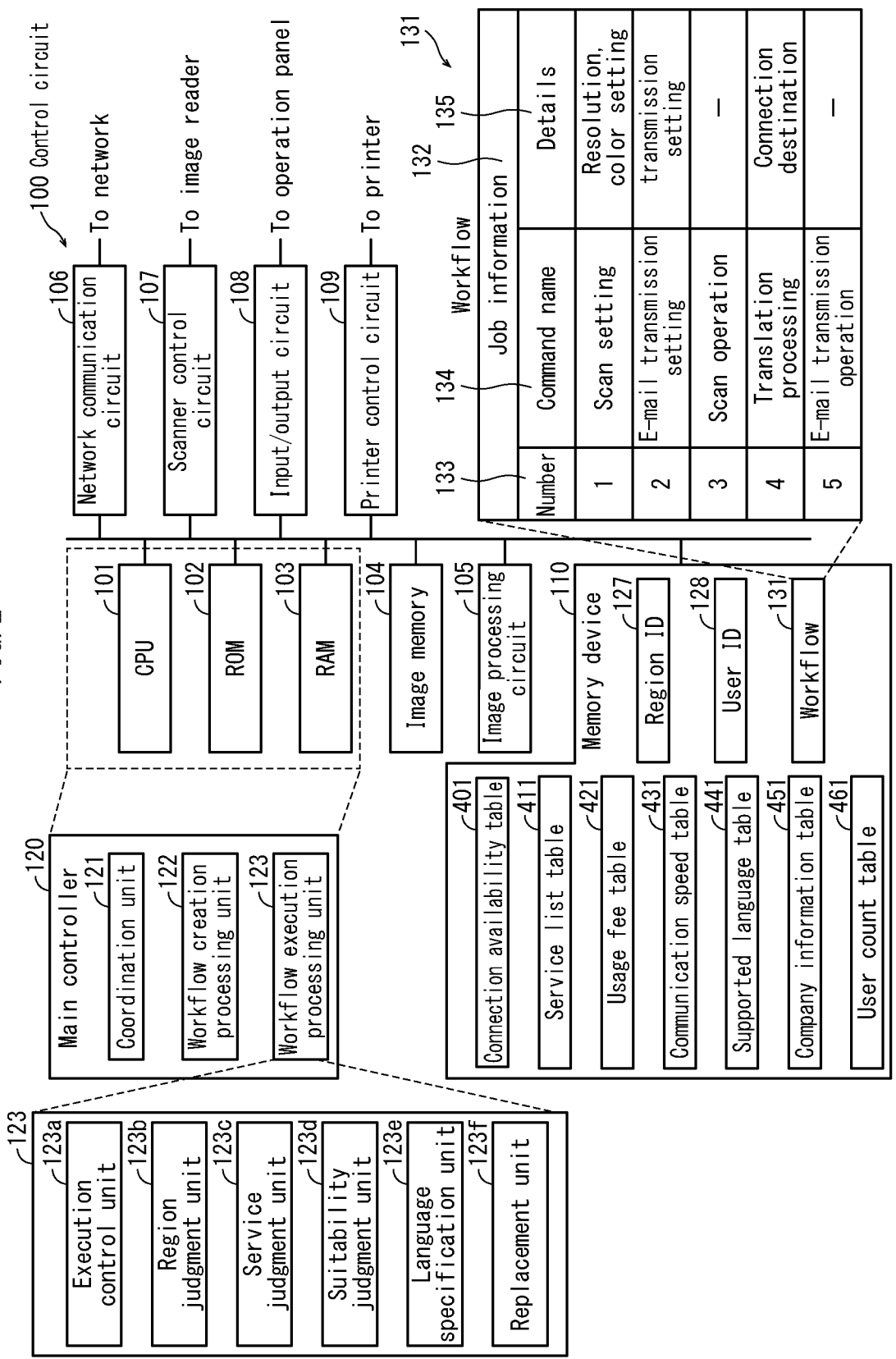
FIG. 2 illustrates a structure of control circuitry 100 in an MFP 10a1.

The control circuitry 100, as illustrated in FIG. 2, includes a hardware processor or central processing unit (CPU) 101, memory including read-only memory (ROM) 102 and random access memory (RAM) 103, image memory 104, an image processing circuit 105, a network communication circuit 106, a scanner control circuit 107, an input/output circuit 108, a printer control circuit 109, a storage device 110, and the like.

The CPU 101, the ROM 102, and the RAM 103 constitute a main controller 120.

The CPU 101 is a microprocessor and includes a fetch unit, a decoding unit, an execution unit, a register file, an instruction counter, and the like. The fetch unit fetches instruction codes one by one from computer instructions stored in the ROM 102 or the RAM 103. Here, the computer instructions are a combination of instruction codes indicating instructions to a computer in order to achieve a defined function. The decoding unit decodes read instruction codes. The execution unit operates according to results of decoding.

The RAM 103 temporarily stores various control variables and the number of copies, etc., set via the operation panel 169, and provides a work area when instructions are executed by the CPU 101.

The ROM 102 stores control instructions for executing various jobs such as a copy operation, and the like.

The CPU 101 operates according to the control instructions stored in the ROM 102.

Further, the main controller 120 receives a users operation instruction from the operation panel 169. For example, when a user's operation is a copy instruction, the main controller 120 causes the scanner control circuit 107 to read an image, and causes the printer control circuit 109 to execute image forming processing according to image data generated by the reading.

Further, for example, when a users operation is an instruction to execute a workflow, the main controller 120 instructs the network communication circuit 106 to transmit a workflow request to the management device 30 and receive the workflow from the management device 30, and executes the workflow received. When executing the workflow, the main controller 120 controls the image processing circuit 105, the network communication circuit 106, the scanner control circuit 107, the printer control circuit 109, and the like so as to execute jobs that constitute the workflow. If a workflow includes a job that requests a server device to execute a service, the main controller 120 instructs the server device to execute the service. Here, a workflow includes multiple jobs, and the multiple jobs are interrelated.

Further, the main controller 120 functions as a coordination unit 121, a workflow creation processing unit 122, and a workflow execution processing unit 123 as illustrated in FIG. 2, when the CPU 101 operates according to the control instructions. The coordination unit 121, the workflow creation processing unit 122, and the workflow execution processing unit 123 are described later.

The image memory 104 temporarily stores image data of a print job or the like.

The image processing circuit 105, for example, performs data processing on RGB color component image data obtained by the image reader 151 to convert to YMCK reproduction color image data. Further, the image processing circuit 105 executes optical character recognition (OCR) processing (recognizing and extracting characters from an image).

The network communication circuit 106 (transmitter) transmits a workflow, a workflow request, and the like to the management device 30 via the network 1a and the network 4. Further, the network communication circuit 106 (acquisition unit) receives a workflow and the like from the management device 30 via the network 4 and the network 1a.

Further, the network communication circuit 106 transmits a job requesting execution of translation or OCR to the server devices 20a1, 20a2, 20a3 via the network 1a (hereinafter also referred to as a cloud job), and receives an execution result of the cloud job from the server devices 20a1, 20a2, 20a3 via the network 1a.

The scanner control circuit 107 controls the image reader 151, and causes execution of a document image reading operation.

The storage device 110 is described below.

1.4 Storage Device 110

The storage device 110 includes non-volatile semiconductor memory. According to one or more embodiments, the storage device 110 is composed of a hard disk.

The storage device 110 includes areas for storing a region ID 127, a user ID 128, a workflow 131, a connection availability table 401, a service list table 411, a usage fee table 421, a communication speed table 431, a supported language table 441, a company information table 451, a user count table 461, and the like.

Here, the connection availability table 401, the service list table 411, the usage fee table 421, the communication speed table 431, the supported language table 441, the company information table 451, and the user count table 461 are, for example, acquired from the management device 30 when the MFP 10a1 is installed in an office or the like, and stored in the storage device 110.

(1) Region ID 127

The region ID 127 is identifying information identifying a network region. A network including the MFP 10a1 is installed in the region identified.

A region to which the manufactured MFP 10a1 is shipped is known in advance, and therefore the region ID identifying the region is written to the storage device 110 immediately before the MFP 10a1 is shipped.

(2) Workflow (Workflow 131)

The workflow 131 is composed of interrelated jobs, as described above.

The workflow 131 is newly created by a user or acquired from the management device 30.

The workflow 131, as illustrated in FIG. 2, is composed of job information 132.

Each piece of the job information 132 corresponds to one job.

Each piece of the job information 132 includes a number 133, a command name 134, details 135, and the like.

Here, the number 133 is identification information for identifying the job information 132, and the number 133 indicates a job execution order in the workflow 131.

The command name 134 is the name of the command executed as a job.

Examples of the command name include "scan setting", "e-mail transmission setting", "scan operation", "translation processing", "e-mail transmission operation", and the like. Here, "scan setting", "e-mail transmission setting", "scan operation", and "e-mail transmission operation" are jobs executed in the MFP 10a1. On the other hand, "translation processing" is a cloud job executed by the server device 20a1 or the like.

The details 135 define details of the job. For example, "scan setting" is defined by the details 135 as "resolution", "color setting", or the like. "E-mail transmission setting" is defined by the details 135 as "transmission destination" or the like. "Translation processing" is defined by the details 135 as "connection destination" or the like.

(Workflow 141)

A workflow is not limited to the data structure of the workflow 131 illustrated in FIG. 2.

A workflow may have a data structure of a workflow 141 illustrated in FIG. 3A.

The workflow 141 is, like the workflow 131, newly created by a user or acquired from the management device 30.

The workflow 141, as illustrated in FIG. 3A, is composed of job information 142. Each piece of the job information 142 corresponds to one job.

Each piece of the job information 142 includes a number 143, a command name 144, a condition 145, details 146, and the like.

The number 143, the command name 144, and the details 146 are as described for the workflow 131 illustrated in FIG. 2.

The condition 145 indicates a condition for executing a job indicated by the piece of job information including the condition 145, based on an execution result of a job indicated by the piece of job information prior to the piece of job information including the condition 145, for example, whether or not to execute the job.

As an example, a piece of job information 142d included in the workflow 141 includes a condition 145d "number of scans: 10 or more". The condition 145d indicates that a job indicated by the job information 142d is executed when the number of scans is 10 or more as an execution result from a job "scanning operation" prior to the job information 142d.

Further, as an example, a piece of job information 142e includes a condition 145e "number of scans: less than 10". The condition 145e indicates that a job indicated by the job information 142e is executed when the number of scans is less than 10 as an execution result from the job "scanning operation" prior to the job information 142e.

FIG. 3B illustrates execution operations of multiple jobs executed according to the workflow 141.

As illustrated in FIG. 3A, the workflow 141 includes job information 142a, 142b, . . . 142f.

When the workflow 141 is executed, steps S11, S12, S13, which correspond to job information 142a, 142b, 142c, are executed as illustrated in FIG. 3B.

In step S14, an execution result of step S13 is referenced, and a branching condition determination is made.

In step S14, if the condition is met ("Yes"), step S15 corresponding to the job information 142d is executed.

In step S14, if the condition is not met ("No"), step S16 corresponding to the job information 142e is executed.

When step S15 or step S16 is finished, step 17, which corresponds to the job information 142f, is executed.

(3) User ID 128

The user ID 128 (user identifier) is identification information identifying a user of the MFP 10a1.

The user ID 128 is temporarily written to the storage device 110 after a user logs into the MFP10a1. When execution of the job or workflow designated by a user is completed, the user ID 128 is deleted from the storage device 110.

(4) Connection Availability Table 401

The connection availability table 401 is a data table indicating whether or not connection is possible to a service provider such as the server devices 20a1, 20a2, 20a3, 20b1, 20b2, 20b3, 20c1, 20c2, 20c3, or the like from country, etc. network regions, for each country, etc. network region.

As illustrated in FIG. 4, the connection availability table 401 includes connection availability information 402. Each piece of connection availability information 402 corresponds to a provider that provides a service (indicated by a service Uniform Resource Locator (URL)).

Each piece of connection availability information 402 includes a service URL 403 and connection availability information 405, 406, 407, 408, 409 for each country, etc. network region.

Here, the service URL 403 is a URL indicating a service provider.

The connection availability information 405, 406, 407, 408, 409 indicates whether or not a connection is possible from the United States (US), European Union (EU), Asia-Pacific (AP) region, Japan (JP), and China (CN), respectively, each representing a country, etc. network region. Here, "OK" indicates connection is possible and "NG" indicates connection is not possible.

Taking the connection availability table 401 as an example, connection is possible from US, EU, AP, JP, and CN to the service URL "example1.com". Further, the service URL "example 2.com" can be connected to (i.e., connectable) from US, EU, AP, and JP, but not from CN. Further, the service URL "example 3.com" can be connected to from EU, AP, JP, and CN, but not from US.

(5) Service List Table 411

The service list table 411 is a data table indicating services that can be provided for each country, etc. network region.

The service list table 411, as illustrated in FIG. 5, is composed of service information 412. Each piece of the service information 412 corresponds to a service provider.

Each piece of the service information 412 includes a category 413 and a service URL 414.

The category 413 indicates a category to which a provided service belongs.

The service URL 414 indicates a URL of a service provider.

Taking the service list table 411 illustrated in FIG. 5 as an example, two service URLs are shown for the category "translation" and two service URLs are shown for the category "OCR".

(6) Usage Fee Table 421

The usage fee table 421 is a data table showing usage fees (service costs) charged to a user when a service is provided for each country, etc. network region.

The usage fee table 421, as illustrated in FIG. 6, is composed of usage fee information 422. Each piece of the usage fee information 422 corresponds to a service provider.

Each piece of the usage fee information 422 includes a category 423, a service URL 424, and a usage fee 425.

The category 423 indicates a category to which a provided service belongs.

The service URL 424 indicates a URL of a service provider.

The usage fee 425 is a usage fee charged to a user when a service is provided. The usage fee is charged according to a unit of service use. For example, a usage fee may be charged according to a period of time a service is used, or a number of times a service is used.

As an example, according to the usage fee table 421 illustrated in FIG. 6, two service URLs and usage fees are shown for the category "translation" and two service URLs and usage fees are shown for the category "OCR".

(7) Communication Speed Table 431

The communication speed table 431 is a data table showing communication speeds when accessing a service, for each service provided for each country, etc. network region.

The communication speed table 431, as illustrated in FIG. 7, is composed of communication speed information 432. Each piece of the communication speed information 432 corresponds to a service provider.

Each piece of the communication speed information 432 includes a category 433, a service URL 434, and a communication speed 435.

The category 433 indicates a category to which a provided service belongs.

The service URL 434 indicates a URL of a service provider.

The communication speed 435 indicates a communication speed at a time of accessing a service when the service is provided.

As an example, according to the communication speed table 431 illustrated in FIG. 7, two service URLs and communication speeds are shown for the category "translation", and two service URLs and communication speeds are shown for the category "OCR".

(8) Supported Language Table 441

The supported language table 441 is a data table showing languages supported for a service when using a service related to language for each country, etc. network region.

The supported language table 441, as illustrated in FIG. 8, is composed of supported language information 442. Each piece of the supported language information 442 corresponds to a service provider providing a service related to language.

Each piece of the supported language information 422 includes a category 443, a service URL 444, and supported languages 445.

The category 443 indicates a category to which a provided language-related service belongs.

The service URL 444 indicates a URL of a service provider.

The supported languages 445 indicates one or more supported languages for a provided service when the service is language-related.

As an example, the supported language table 441 illustrated in FIG. 8 shows two sets of a service URL and supported languages for the category "translation".

Of the two service URLs, the languages supported by one service URL are indicated by "en", "ja", and "de", while the languages supported by the other service URL are indicated by "en", "ja", and "zh".

Here, "en", "ja", "de", and "zh" indicate "English", "Japanese", "German", and "Chinese", respectively.

(9) Company Information Table 451

The company information table 451 is a data table showing information related to a company that provides a service when a service is provided, for each country, etc. network region.

The company information table 451, as illustrated in FIG. 9, includes multiple sets of service URLs 452 and company information 453. Each set corresponds to a service provider.

The service URL 452 indicates a URL of a service provider.

The company information 453 includes country 454, year established 455, and number of countries (to which a service is provided) 456.

The country 454 indicates a country in which the service provider company was established.

The year established 455 indicates a year in which the service provider company was established.

The number of countries 456 indicates a total number of countries, etc. that the service provider provides a service for.

(10) User Count Table 461

The user count table 461 is a data table showing a total number of users of a provided service for each year.

The user count table 461, as illustrated in FIG. 10, is composed of user count information 462. Each piece of the user count information 462 corresponds to a service provider.

Each piece of the user count information 462 includes a service URL 463, a year 464, and a user count 465.

The service URL 463 indicates a URL of a service provider.

The year 464 indicates a year in which the total number of users was aggregated.

The user count 465 indicates a total number of users who used a service provided from the service URL 463 in the year 464.

1.5 Example Screen Displayed on Operation Panel 169

The following is a description of an example screen displayed on the operation panel 169.

(1) A screen 501 displayed when a region ID is set for the MFP 10a1 is described below.

Figure 11:
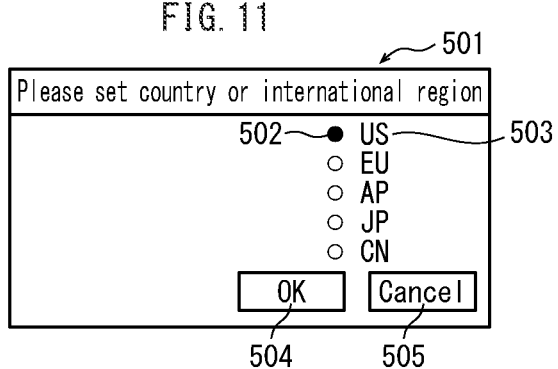
FIG. 11 illustrates a screen 501 displayed on an operation panel 169 of the MFP 10*a*1.

As illustrated in FIG. 11, the screen 501 is a screen for writing the region ID 127 to the storage device 110, where the region ID 127 is identification information for identifying a network region to which the MFP 10a1 will be shipped.

A manufacturer of the MFP 10a1 knows which country, etc., i.e., network region, the MFP 10a1 will be shipped to, and therefore the country, etc., the MFP 10a1 will be shipped to is selected on the screen 501.

The screen 501 includes, for each country, etc., a display item 503 indicating the country, etc. and a selection button 502, a button 504 for instructing writing of the region ID, and a button 505 for canceling writing of the region ID.

The manufacturer selects the selection button 502 corresponding to the display item 503 indicating a country, etc., then when the button 504 is operated, the region ID corresponding to the display item 503 is written to the storage device 110.

(2) A screen displayed when a workflow is created for the MFP 10a1 is described below.

(a) Screen 511

The following describes a screen 511 for selecting a job when generating a workflow.

Figure 12A:
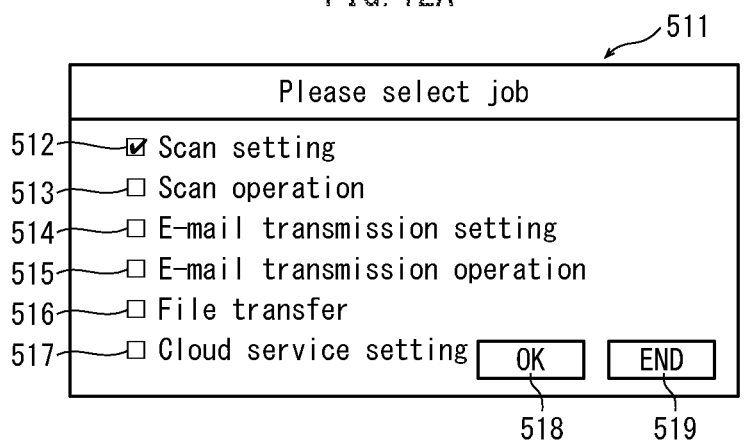
FIG. 12A illustrates a screen 511 displayed on the operation panel 169.

As illustrated in FIG. 12A, the screen 511 includes check boxes 512, 513, 514, 515, 516, 517 corresponding to a scan setting, a scan operation, an e-mail transmission setting, an e-mail transmission operation, file transfer, and cloud service setting, respectively, a button 518 to approve job selection, and a button 519 for ending job selection.

The screen 511 includes items for selecting jobs other than those mentioned above.

When the check box 512 is selected by a user and the button 518 is subsequently operated, a job "scan setting" is generated in a workflow.

When a user operates the button 519, workflow generation is completed.

(b) Screen 521

Figure 12B:
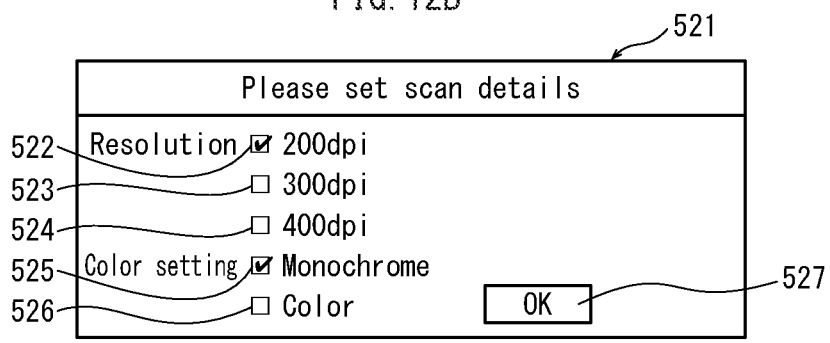
FIG. 12B illustrates a screen 521 displayed on the operation panel 169.

When the scan setting is selected and the button 518 is subsequently operated on the screen 511, screen 521 is displayed, as illustrated in FIG. 12B.

The screen 521 includes items to be selected in scan setting. For example, the screen 521 includes check boxes 522, 523, 524 for selecting 200 dpi, 300 dpi, or 400 dpi resolution, respectively, check boxes 525, 526 for selecting a monochrome or color, respectively, and a button 527 for ending selection.

When a user selects one of the check boxes 522, 523, 524, and one of the check boxes 525, 526, then operates the button 527, generation of scan details is completed.

(c) Screen 531

Figure 12C:
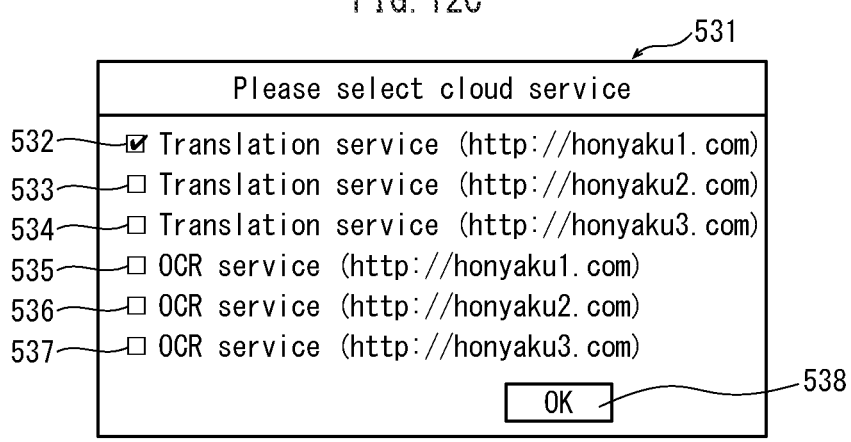
FIG. 12C illustrates a screen 531 displayed on the operation panel 169.

When the cloud service setting is selected and the button 518 is subsequently operated on the screen 511, screen 531 is displayed, as illustrated in FIG. 12C.

The screen 531 includes items to be selected in cloud service setting. For example, the screen 531 includes check boxes 532, 533, 534, 535, 536, 537 for selecting three types of translation service and three types of OCR service, respectively, and a button 538 for ending service selection.

When any one of the check boxes 532, 533, 534, 535, 536, 537 is selected and then the button 538 is operated by a user, a job "cloud service setting" is generated in the workflow.

1.6 Main Controller 120

As described above, the main controller 120 functions as the coordination unit 121, the workflow creation processing unit 122, and the workflow execution processing unit 123 as illustrated in FIG. 2, when the CPU 101 operates according to the control instructions.

(1) Coordination Unit 121

When the CPU 101 operates according to the control instructions, the coordination unit 121 coordinates control of the image memory 104, the image processing circuit 105, the network communication circuit 106, the scanner control circuit 107, the input/output circuit 108, the printer control circuit 109, the storage device 110, and the like. Further, the coordination unit 121 coordinates control of the workflow creation processing unit 122 and the workflow execution processing unit 123.

When the operation panel 169 receives input, the coordination unit 121 receives the input from the operation panel 169 via the input/output circuit 108. Inputs received from the operation panel 169 include initialization, copying, workflow creation, workflow execution, and other processing.

When a received input is for initialization, copying, workflow creation, workflow execution, or other processing, the coordination unit 121 causes execution of initialization, copying, workflow creation, workflow execution, or other processing, respectively.

When a received input is initialization, the coordination unit 121 controls the operation panel 169 to display the screen 501. When the screen 501 is displayed, the coordination unit 121 accepts setting of country, etc. from the operation panel 169, selects the region ID corresponding to the country, etc., and write the selected region ID to the storage device 110.

When a received input is copying, processing described above is executed.

When a received input is workflow creation or workflow execution, the coordination unit 121 controls the workflow creation processing unit 122 or the workflow execution processing unit 123 to execute workflow creation processing or workflow execution processing.

The following describes the workflow creation processing unit 122 and the workflow execution processing unit 123.

(2) Workflow Creation Processing Unit 122

As described below, the workflow creation processing unit 122 (generation unit) generates a workflow according to user operation, and transmits the generated workflow to the management device 30.

The workflow creation processing unit 122 requests that a user log in, and acquires a user ID identifying the user based on the user login.

The workflow creation processing unit 122 displays the screen 511 illustrated in FIG. 12A as a list of jobs. The screen 511 receives a job selection from the user, and the screen 521 illustrated in FIG. 12B and the screen 531 illustrated in FIG. 12C and the like receive job details from the user. The workflow creation processing unit 122 repeats reception of job selection and details from the user for each job in the workflow. When reception of job selection and details is complete, the workflow creation processing unit 122 generates a workflow including the jobs received.

The workflow creation processing unit 122 reads the region ID from the storage device 110.

The workflow creation processing unit 122 transmits the user ID, the region ID, and the workflow to the management device 30 via the network communication circuit 106, the network 1a, and the network 4.

(3) Workflow Execution Processing Unit 123

The workflow execution processing unit 123 executes a workflow as illustrated below.

As illustrated in FIG. 2, the workflow execution processing unit 123 includes an execution control unit 123a, a region determination unit 123b (first determination unit), a service determination unit 123c (second determination unit), a suitability determination unit 123d (third determination unit), a language specification unit 123e, and a replacement unit 123f.

Control of the execution control unit 123a, the region determination unit 123b, the service determination unit 123c, the suitability determination unit 123d, the language specification unit 123e, and the replacement unit 123f is coordinated.

The execution control unit 123a requests that a user log in, and acquires a user ID identifying the user based on the user login.

On receiving the user ID, the execution control unit 123a transmits the user ID and a workflow request to the management device 30 via the network communication circuit 106, the network 1a, and the network 4.

In a response to the request, the execution control unit 123a receives a workflow and a region ID from the management device 30 via the network 4, the network 1a, and the network communication circuit 106. Here, when a plurality of workflows corresponds to a user ID, the execution control unit 123a receives the plurality of workflows from the management device.

On receiving a workflow, the execution control unit 123a controls the operation panel 169 to display a workflow list including the received workflow. Here, the workflow list may include all job information of all jobs included in all workflows. Further, the workflow list may include workflow names for all workflows that are each an identifier that identifies a workflow.

The execution control unit 123a receives designation of a selected workflow from the workflow list according to a user operation from the operation panel 169.

On receiving designation of a workflow, the execution control unit 123a reads a region ID stored on the storage device 110.

When a region ID is read, the service determination unit 123c checks the jobs included in the designated workflow and determines whether or not a job (also referred to as a cloud job) that requests a service (also referred to as a cloud service) from a server device is included.

Next, the region determination unit 123b determines whether or not the region ID received from the management device 30 (the region identified by the received region ID is also referred to as a first region) matches the region ID read from the storage device 110 (the region identified by the read region ID is also referred to as a second region).

If it is determined that a cloud job is not included in the workflow, or if it is determined that the region ID received from the management device 30 matches the region ID read from the storage device 110, the execution control unit 123a executes the jobs included in the workflow in the order listed. When execution of all jobs in the workflow is completed, processing by the workflow execution processing unit 123 ends.

On the other hand, if it is determined that a cloud job is included in the workflow and it is determined that the region ID received from the management device 30 does not match the region ID read from the storage device 110, the execution control unit 123a repeats steps (a) to (e) described below for each cloud job included in the workflow.

(a) Determine Whether or not Connection to a Cloud Service is Possible

The suitability determination unit 123d uses connection availability information included in the connection availability table 401 to determine whether or not connection to the cloud service requested by the cloud job is possible from the region where the MFP 10a1 is installed. This determines whether execution of a cloud service requested by a cloud job is appropriate.

In order to determine whether or not connection to a cloud service is possible, the suitability determination unit 123d uses the connection availability table 401 illustrated in FIG. 4.

For example, if a service URL of a cloud service requested by a cloud job in a workflow is "example1.com" and a region in which the MFP 10a1 is installed is "JP", connection availability for "JP" in the connection availability table 401 is "OK", and therefore the suitability determination unit 123d determines that connection to the service URL "example1.com" from the region "JP" is possible.

Further, for example, if a service URL of a cloud service requested by a cloud job in a workflow is "example 2.com" and a region in which the MPF 10a1 is installed is "CN", connection availability for "CN" in the connection availability table 401 is "NG", and therefore the suitability determination unit 123d determines that connection to the service URL "example 2.com" from the region "CN" is not possible.

Further, for example, if a service URL of a cloud service requested by a cloud job in a workflow is "example 3.com" and a region in which the MPF 10a1 is installed is "US", connection availability for "US" in the connection availability table 401 is "NG", and therefore the suitability determination unit 123d determines that connection to the service URL "example 3.com" from the region "US" is not possible.

When it is determined that a cloud service requested by a cloud job can be connected to from the region where the MFP 10a1 is installed, the execution control unit 123a can execute the cloud service without problem.

On the other hand, when it is determined that a cloud service requested by a cloud job cannot be connected to from the region where the MFP 10a1 is installed, the execution control unit 123a uses the service list table 411 illustrated in FIG. 5, which shows services that can be provided for each country, etc., to select a service that can be provided to the region in which the MFP 10a1 is installed as an alternative service. In this case, the execution control unit 123a selects a service that belongs to the same category as the service of the cloud job.

Here, for example, if a service URL of a cloud service requested by a cloud job in a workflow is "example 2.com" and a region in which the MPF 10a1 is installed is "CN", according to the connection availability table 401, connection to the service URL "example 2.com" from the region "CN" is not possible.

However, according to the connection availability table 401, connection to the service URL "example1.com" or "example 3.com" from the region "CN" is possible.

Accordingly, the execution control unit 123a provisionally selects the service URLs "example1.com" and "example 3.com" as candidates.

Next, the execution control unit 123*a* selects service information corresponding to the service URL "example1.com" and "example 3.com" from the service list table 411. The service URL "example1.com" exists in the service list table 411, and therefore the execution control unit 123*a* selects service information including the service URL "example1.com" from the service list table 411 as an alternative service.

At this time, for example, when the category of a cloud job is "translation", the execution control unit 123*a* selects service information including the category "translation" from the service list table 411. In the above example, the execution control unit 123*a* selects service information 412*a* including the category "translation" and the service URL "http://example1.com/api/translate/" from the service list table 411.

Next, the execution control unit 123*a* outputs the service information selected from the service list table 411 to the operation panel 169, and causes the selected service information to be presented (i.e., displayed) as an alternative service. In the above example, the execution control unit 123*a* presents the service information 412*a* including the category "translation" and the service URL "http://example1.com/api/translate/" on the operation panel 169 as an alternative service.

(b) Determination of Usage Fee in Region

The suitability determination unit 123*d* uses usage fee information, i.e., service fees, included in the usage fee table 421, to determine whether or not a usage fee when using a cloud service is cheap, when connecting to a cloud service requested by a cloud job from a region the MFP 10*a*1 is installed in. That is, the suitability determination unit 123*d* determines whether or not there is a service provided for a lower usage fee than a usage fee of a cloud service requested by a cloud job included in a workflow in a region the MFP 10*a*1 is installed in. Thus, the suitability determination unit 123*d* determines whether implementing a cloud service is appropriate.

In order to determine whether or not a usage fee when using a cloud service is cheap, the suitability determination unit 123*d* uses the usage fee table 421 illustrated in FIG. 6.

For example, if a service URL of a cloud service requested by a cloud job is "example 2.com", the suitability determination unit 123*d* uses the usage fee table 421 to compare the usage fee of the service URL "example 2.com" to a usage fee of another service URL when using the cloud service. According to the usage fee table 421, the usage fee for the service URL "http://example1.com/api/translate/" is "1", and the usage fee for the service URL "http://example 2.com/api/translate/" is "2".

Accordingly, the execution control unit 123*a* selects usage fee information including the service URL "http://example1.com/api/translate", which has a lower usage fee, as an alternative service.

Next, the execution control unit 123*a* outputs the usage fee information selected from the service list table 421 to the operation panel 169, and causes the selected usage fee information to be presented as an alternative service. In the above example, the execution control unit 123*a* presents service information 422*a* including the category "translation" and the service URL "http://example1.com/api/translate/" on the operation panel 169 as an alternative service.

(c) Determination of Communication Speed in Region

The suitability determination unit 123*d* uses communication speed information included in the communication speed table 431 to determine whether or not access communication speed is high when connecting to a cloud service requested by a cloud job from the region in which the MFP 10*a*1 is installed. That is, the suitability determination unit 123*d* determines whether or not there is a service at a higher communication speed than a communication speed when accessing a cloud service requested by a cloud job included in a workflow in a region the MFP 10*a*1 is installed in. Thus, the suitability determination unit 123*d* determines whether implementing a cloud service is appropriate.

In order to determine whether or not a communication speed is high when accessing a cloud service requested by a cloud job, the suitability determination unit 123*d* uses the communication speed table 431 illustrated in FIG. 7.

For example, when the service URL of a cloud service is "example 2.com", the suitability determination unit 123*d* uses the communication speed table 431 to compare communication speed for the service URL "example 2.com" to communication speed for another service URL when accessing the cloud service. According to the communication speed table 431, communication speed for the service URL "http://example1.com/api/translate/" is "50", and communication speed for the service URL "http//example 2.com/api/translate/" is "40".

Accordingly, the execution control unit 123*a* selects communication speed information including the service URL "http://example1.com/api/translate", which has a higher communication speed, as an alternative service.

Next, the execution control unit 123*a* outputs the communication speed information selected from the communication speed table 431 to the operation panel 169, and causes the selected communication speed information to be presented as an alternative service. In the above example, the execution control unit 123*a* presents communication speed information 432*a* including the category "translation" and the service URL "http://example1.com/api/translate/" on the operation panel 169 as an alternative service.

(d) Determination with Language Processing

The service determination unit 123*c* determines whether an acquired workflow includes a job that requests a service that provides processing related to language. In other words, the service determination unit 123*c* determines whether or not a cloud service requested by a cloud job in a workflow includes language processing of data.

When the service determination unit 123*c* determines that a workflow includes a job that requests a service that provides processing related to language, the language specification unit 123*e* specifies a language included in data to be processed in a cloud service requested by a cloud job in the workflow. Here, when the data to be processed is, for example, image data obtained by scanning, the language specification unit 123*e* controls the image processing circuit 105 to execute OCR on the obtained image data. The language specification unit 123*e* receives a character string extracted from the image processing circuit 105 and uses the received character string to specify a language included in the image data.

The suitability determination unit 123*d* uses supported language information included in the supported language table 441 to determine whether or not the language specified by the language specification unit 123*e* can be processed in the cloud service requested by the cloud job. Thus, the suitability determination unit 123*d* determines whether implementing a cloud service is appropriate.

The suitability determination unit 123*d* determines whether or not a language specified by the language specification unit 123*e* can be processed as follows.

The suitability determination unit 123*d* reads supported language information including a service URL corresponding to a cloud service requested by a cloud job from the supported language table 441 illustrated in FIG. 8. Next, the suitability determination unit 123d extracts supported languages from the supported language information. Next, the suitability determination unit 123d determines whether or not the extracted supported languages include a language specified by the language specification unit 123e.

When the suitability determination unit 123d determines that extracted supported languages include a language specified by the language specification unit 123e, the suitability determination unit 123d determines that processing is possible for the language specified by the language specification unit 123e by a cloud service requested by a cloud job. In this case, there is no problem in executing the cloud job.

On the other hand, when the suitability determination unit 123d determines that extracted supported languages do not include a language specified by the language specification unit 123e, the suitability determination unit 123d determines that processing is not possible for the language specified by the language specification unit 123e by a cloud service requested by a cloud job. In this case, the execution control unit 123a extracts supported language information including the language specified by the language specification unit 123e from the supported language table 441. Next, the execution control unit 123a selects a service URL included in the extracted supported language information as an alternative service.

Next, the execution control unit 123a outputs the service URL extracted and selected from the supported language table 441 to the operation panel 169, and causes the selected service URL to be presented as an alternative service.

(e) Alternative Service Reception and Replacement

The execution control unit 123a receives an instruction of whether or not to switch to an alternative service from the operation panel 169.

Upon receiving an instruction to switch to an alternative service, the replacement unit 123f replaces a cloud service included in a cloud job in a workflow with the alternative service.

Upon receiving an instruction to not switch to an alternative service, replacement with the alternative service does not occur.

(f) Workflow Execution

When repetition of steps (a) through (e) is completed for each cloud job included in a workflow, and when the replacement unit 123f replaces a cloud service included in a cloud job in the workflow with an alternative service for which an instruction to switch is received, the execution control unit 123a executes the workflow including the alternative service. On the other hand, when the replacement unit 123f does not replace a service with an alternative service, the execution control unit 123a executes the workflow without an alternative service replacing a service.

1.7 Management Device 30

Figure 13:
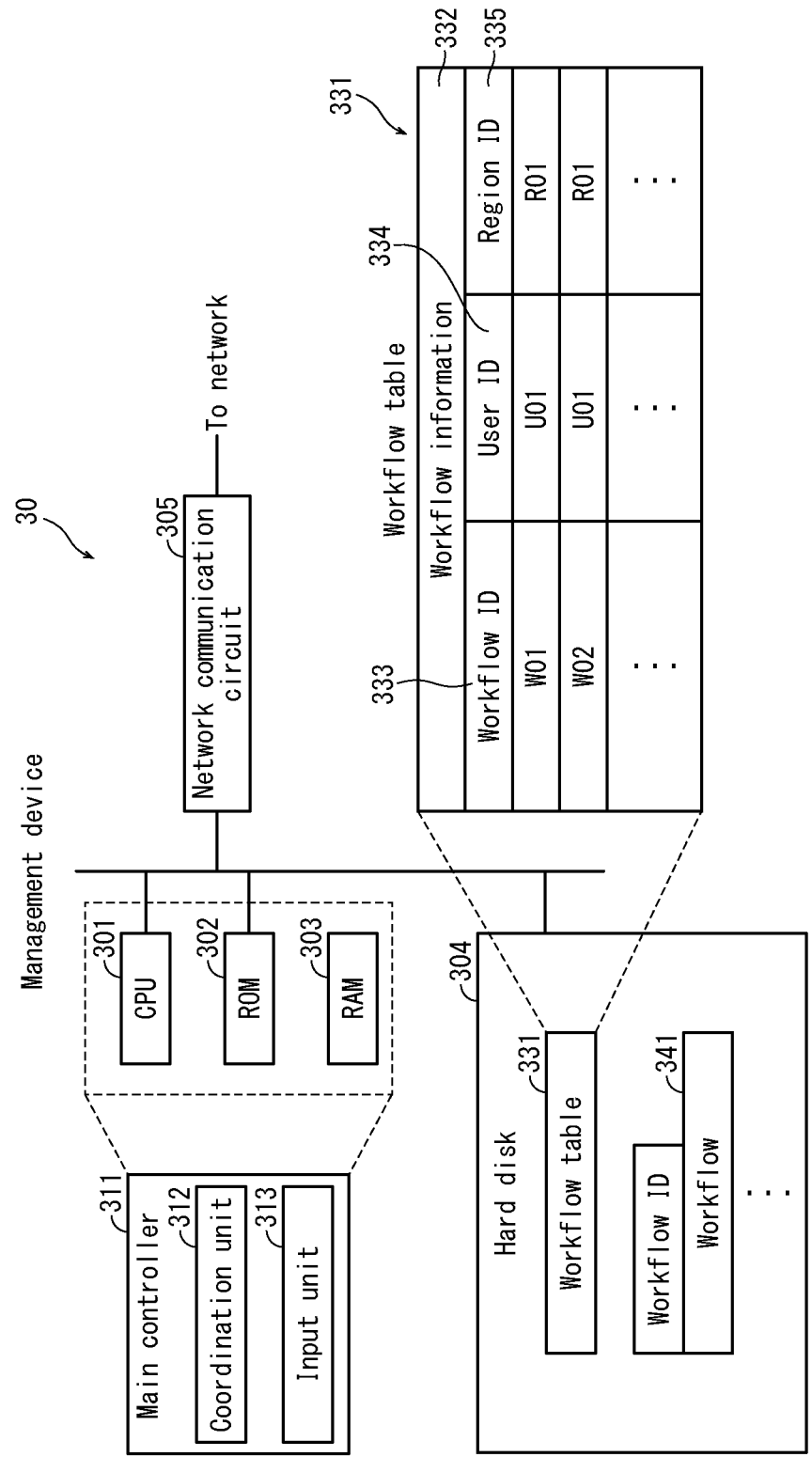
FIG. 13 illustrates structure of a management device 30.

As illustrated in FIG. 13, the management device 30 includes a CPU 301, ROM 302, RAM 303, a hard disk 304, a network communication circuit 305, and the like.

The RAM 303 provides a work area when instructions are executed by the CPU 301.

The ROM 302 stores control instructions for executing various functions of the management device 30.

The CPU 301 operates according to the control instructions stored in the ROM 302.

The CPU 301, the ROM 302, and the RAM 303 constitute a main controller 311.

When the CPU 301 operates according to the control instructions, the main controller 311 coordinates control of the hard disk 304, the network communication circuit 305, and the like. Further, when the CPU 301 operates according to the control instructions, the main controller 311 constitutes a coordination unit 312 and an input/output unit 313.

(1) Hard Disk 304

As illustrated in FIG. 13, the hard disk 304 stores a workflow table 331. Further, the hard disk 304 has an area for storing workflows 341.

The workflows 341 are workflows received from the MFP 10a1 and the like.

As illustrated in FIG. 13, the workflow table 331 includes an area for storing workflow information 332.

Each piece of the workflow information 332 corresponds to a workflow received from an MFP.

Each piece of the workflow information 332 includes a workflow ID 333, a user ID 334, and a region ID 335.

The workflow ID 333 is identifying information identifying a workflow.

The user ID 334 is identifying information identifying a user pertaining to generation and use of a workflow.

The region ID 335 is identifying information identifying a region where a device that generated a workflow is installed.

(2) Network Communication Circuit 305

The network communication circuit 305 is connected to other devices via the network 4. The network communication circuit 305 sends and receives information to and from other devices via the network 4.

The network communication circuit 305 receives, for example, a region ID, a user ID, and a workflow from the MFP 10a1. Upon receiving a region ID, a user ID, and a workflow, the network communication circuit 305 outputs the received region ID, user ID, and workflow to the coordination unit 312.

Further, the network communication circuit 305 receives, for example, a workflow request and a user ID from the MFP 10al. Upon receiving a workflow request and a user ID, the network communication circuit 305 outputs the received workflow request and user ID to the coordination unit 312.

Further, the network communication circuit 305 receives from the coordination unit 312, for example, a workflow and a region ID destined for the MFP 10a1. Upon receiving a workflow and region ID destined for the MFP 10al, the network communication circuit 305 transmits the workflow and region ID to the network 4 with the MFP 10a1 as the destination. The workflow and region ID destined for the MFP 10a1 are transmitted to the MFP 10a1 via the network 4 and the network 1a.

(3) Coordination Unit 312

The coordination unit 312 coordinates control of the hard disk 304 and the network communication circuit 305. Further, the coordination unit 312 controls the input/output unit 313.

The coordination unit 312 receives, for example, a region ID, a user ID, and a workflow from the MFP 10a1 from the network communication circuit 305. Further, the coordination unit 312 receives, for example, a workflow request and a user ID from the MFP 10a1 from the network communication circuit 305.

Upon receiving a region ID, user ID, and workflow, the coordination unit 312 generates a workflow ID identifying the received workflow. Next, the coordination unit 312 controls the input/output unit 313 to write the received workflow to the hard disk 304 with the generated workflow ID as a filename. Further, the coordination unit 312 controls the input/output unit 313 to add workflow information including the generated workflow ID, and the received user ID and region ID to the workflow table 331.

Further, upon receiving a workflow request and a user ID from the MFP 10*al*, the coordination unit 312 controls the input/output unit 313 to read a requested workflow. Further, the coordination unit 312 controls the input/output unit 313 to read workflow information including the received user ID from the workflow table 331. Subsequently, the coordination unit 312 extracts a region ID from the read workflow information. Next, the coordination unit 312 outputs the read workflow and extracted region ID to the network communication circuit 305 to transmit onwards with the MFP 10*a*1 as the destination.

(4) Input/Output Unit 313

The input/output unit 313 writes the workflow received from the coordination unit 312 to the hard disk 304 according to the control of the coordination unit 312. Further, the input/output unit 313 reads a workflow from the hard disk 304 and outputs the read workflow to the coordination unit 312 according to the control of the coordination unit 312.

Further, the input/output unit 313 adds workflow information received from the coordination unit 312 to the workflow table 331 according to the control of the coordination unit 312.

Further, the input/output unit 313 reads workflow information from the workflow table 331 and outputs the read workflow information to the coordination unit 312 according to the control of the coordination unit 312.

1.8 Server Device 20*a*1.

The following describes the server device 20*a*1 as representative of the server devices 20*a*1, 20*a*2, 20*a*3, 20*b*1, 20*b*2, 20*b*3, 20*c*1, 20*c*2, 20*c*3. The server devices 20*a*2, 20*a*3, 20*b*1, 20*b*2, 20*b*3, 20*c*1, 20*c*2, 20*c*3 each have similar structure to the server device 20*a*1, and description thereof is omitted.

Figure 14:
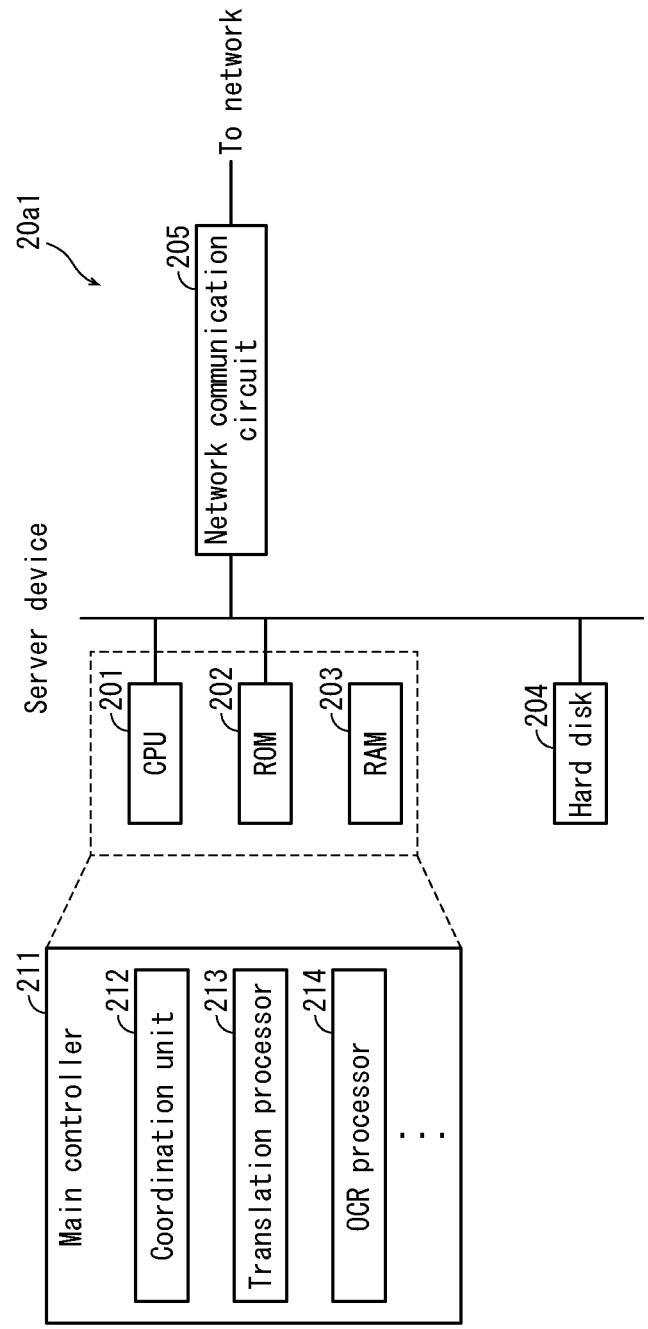
FIG. 14 illustrates structure of a server device 20*a*1.

As illustrated in FIG. 14, the server device 20*a*1 includes a CPU 201, ROM 202, RAM 203, a hard disk 204, a network communication circuit 205, and the like.

The RAM 203 provides a work area when instructions are executed by the CPU 201.

The ROM 202 stores control instructions for executing various functions of the server device 20*a*1.

The CPU 201 operates according to the control instructions stored in the ROM 202.

The CPU 201, the ROM 202, and the RAM 203 constitute a main controller 211.

When the CPU 201 operates according to the control instructions, the main controller 211 coordinates control of the hard disk 204, the network communication circuit 205, and the like. Further, when the CPU 201 operates according to the control instructions, the main controller 211 constitutes a coordination unit 212, a translation processor 213, an OCR processor 214, and the like.

(1) Hard Disk 204

The hard disk 204 is used as a work area for the main controller 211 and a storage area for products of the translation processor 213, the OCR processer 214, and the like.

(2) Network Communication Circuit 205

The network communication circuit 205 sends and receives information to and from other devices.

(3) Main Controller 211

As stated above, the main controller 211 includes the coordination unit 212, the translation processor 213, the OCR processor 214, and the like.

Here, the main controller 211 need not includes the translation processor 213, and need not include the OCR processor 214. Further, the main controller 311 may include a service processor that executes a service other than translation, OCR, or the like.

The coordination unit 212 coordinates control of the hard disk 204, the network communication circuit 205, the translation processor 213, the OCR processor 214, and the like.

The translation processor 213 has a function of translating data (character information) received from an external device via the network communication circuit 205 from Japanese, for example, to English, French, German, Chinese, etc., and from English, for example, to Japanese, French, German, Chinese, etc. The translation processor 213 transmits translation results to an external device via the network communication circuit 205.

The OCR processor 214 recognizes characters in an image representing image data received from an external device via the network communication circuit 205, and extracts the characters. The OCR processor 214 transmits extracted character strings to an external device via the network communication circuit 205.

1.9 Operations of Devices

The following describes operations of each device.

(1) Operations of MFP 10*a*1

Figure 15:
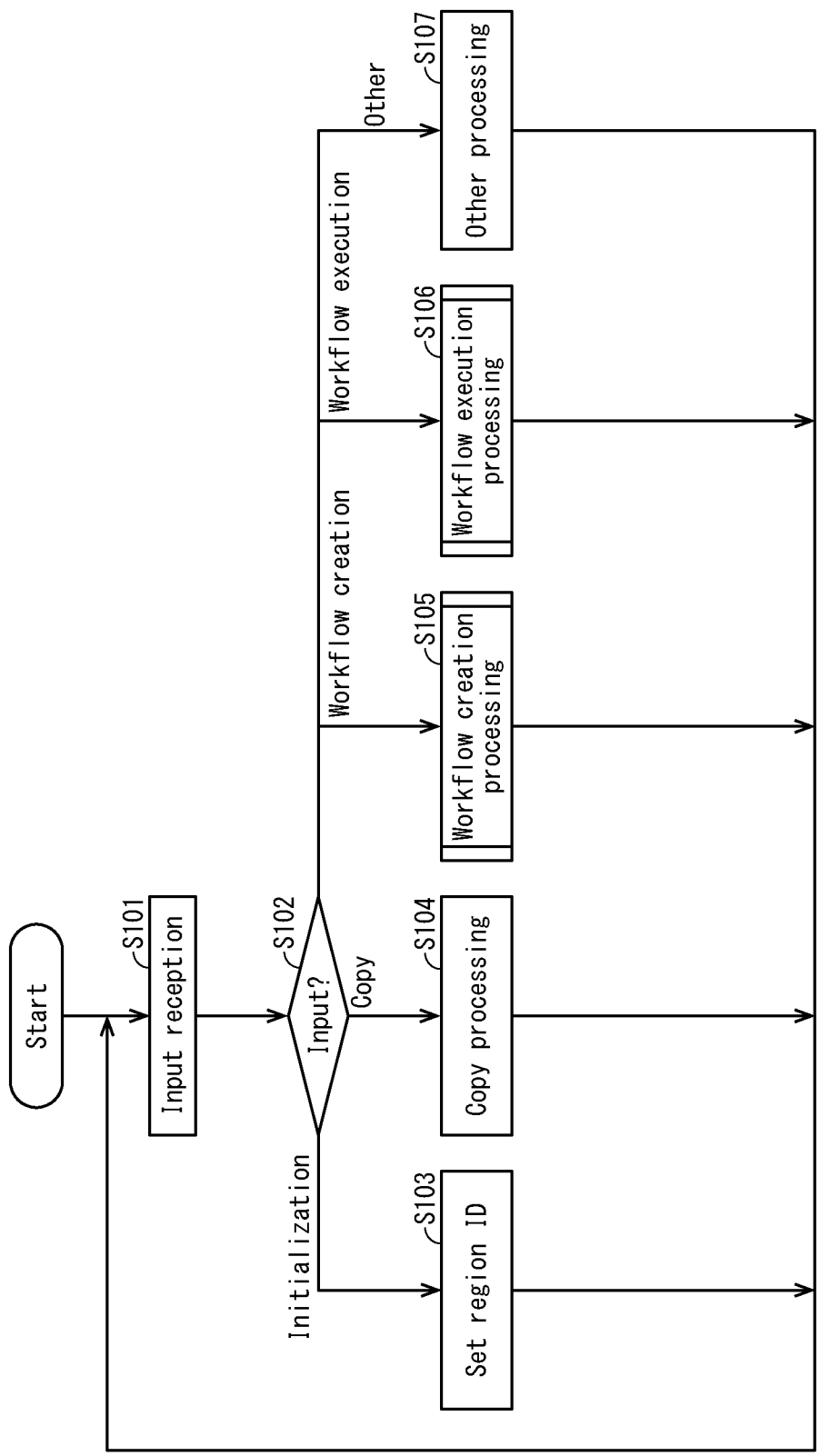
FIG. 15 is a flowchart illustrating operations of the MFP 10*a*1.

Operations of the MFP 10*a*1 are described with reference to the flowchart illustrated in FIG. 15.

The operation panel 169 receives user input. The coordination unit 121 receives input from the operation panel 169 via the input/output circuit 108 (step S101).

When received input is for initialization, copying, workflow creation, workflow execution, or the like, the coordination unit 121 executes controls for executing initialization processing, copy processing, workflow creation processing, workflow execution, or the like.

Specifically, when received input is for initialization ("initialization" in step S102), the coordination unit 121 writes to the storage device 110 a region ID corresponding to a region set in the screen 501, thereby setting the region ID (step S103). Next, the coordination unit 121 returns processing to step S101.

When received input is for copying ("copying" in step S102), the coordination unit 121 controls the scanner control circuit 107 and the printer control circuit 109 to execute copying (step S104). Next, the coordination unit 121 returns processing to step S101.

When received input is for workflow creation ("workflow creation" in step S102), the coordination unit 121 controls the workflow creation processing unit 122 to execute workflow creation (step S105). Next, the coordination unit 121 returns processing to step S101.

When received input is for workflow execution ("workflow execution" in step S102), the coordination unit 121 controls the workflow execution processing unit 123 to execute a workflow (step S106). Next, the coordination unit 121 returns processing to step S101.

When received input for something else ("other" in step S102), the coordination unit 121 executes a control to execute corresponding processing (step S107). Next, the coordination unit 121 returns processing to step S101.

This concludes description of overall operation of the MFP 10*al*.

Operations of the MFP 10*a*2, 10*a*3, 10*b*1, 10*b*2, 10*b*3, 10*c*1, 10*c*2, 10*c*3 are the same as those of the MFP 10*al*.

(2) Operations of Workflow Creation Processing

Operations of workflow creation processing in the MFP 10*a*1 and the management device 30 are described with reference to the flowchart illustrated in FIG. 16.

The workflow creation processing unit 122 requests that a user log in, and acquires a user ID identifying the user based on the user login (step S151).

The workflow creation processing unit 122 displays the screen 511 as a list of jobs (step S152).

The workflow creation processing unit 122 receives a job selection from the user on the screen 511 (step S153) and further receives job details from the user on the screen 521, the screen 531, etc. (step S154). Next, the workflow creation processing unit 122 stores a command name and job details (step S155).

The workflow creation processing unit 122 determines whether job selection is complete (step S156). If job selection is not complete ("NO" in step S156), the workflow creation processing unit 122 returns processing to step S153 and repeats reception of job selection and details from the user.

When job selection is completed ("YES" in step S156), the workflow creation processing unit 122 generates a workflow including received jobs (step S157).

The workflow creation processing unit 122 reads the region ID from the storage device 110 (step S158).

Next, the workflow creation processing unit 122 transmits the user ID, the region ID, and the workflow to the management device 30 via the network communication circuit 106, the network 1a, and the network 4 (step S159). The coordination unit 312 of the management device 30 receives the region ID, the user ID, and the workflow from the MFP 10a1 from the network communication circuit 305 (step S159).

Next, the coordination unit 312 controls the input/output unit 313 to write the received workflow to the hard disk 304 with the generated workflow ID as a filename (step S160). Further, the coordination unit 312 controls the input/output unit 313 to add workflow information including the generated workflow ID, and the received user ID and region ID to the workflow table 331 (step S161).

This completes workflow creation processing.

Operations of the MFP 10a2, 10a3, 10b1, 10b2, 10b3, 10c1, 10c2, 10c3 are the same as those of the MFP 10a1.

(3) Workflow Execution Operations

Operations of workflow execution processing in the MFP 10a1 and the management device 30 are described with reference to the flowchart illustrated in FIG. 17 and FIG. 18.

The execution control unit 123a requests that a user log in, and acquires a user ID identifying the user based on the user login (step S201).

On receiving the user ID, the execution control unit 123a transmits the user ID and a workflow request to the management device 30 via the network communication circuit 106, the network 1a, and the network 4 (step S202). The management device 30 receives the workflow request and user ID from the MFP 10a1 (step S202).

The coordination unit 312 of the management device 30 reads the requested workflow via the input/output unit 313, and the coordination unit 312 reads the region ID corresponding to the received user ID from the workflow table 331 via the input-output unit 313 (step S203). Next, the coordination unit 312 outputs the read workflow and region ID to the network communication circuit 305 to transmit onwards with the MFP 10a1 as the destination (step S204).

The execution control unit 123a receives the workflow and region ID from the management device 30 via the network 4, the network 1a, and the network communication circuit 106 (step S204).

The execution control unit 123a displays a workflow list via the operation panel 169 (step S205).

The execution control unit 123a receives instructions to select and execute a workflow from the workflow list according to a user operation from the operation panel 169 (step S206).

Next, the execution control unit 123a reads a region ID stored on the storage device 110 (step S207).

The service determination unit 123c checks jobs included in the selected workflow (step S208) and determines whether or not a cloud job requesting a cloud service is included (step S209).

When it is determined that a cloud job requesting a cloud service is included ("YES" in step S209), the region determination unit 123b determines whether the region ID received from the management device 30 matches the region ID read from the storage device 110 (step S210).

When it is determined that a cloud job is not included in the workflow ("NO" in step S209), or it is determined that the region ID received from the management device 30 matches the region ID read from the storage device 110 ("Match" in step S210), the execution control unit 123a executes the jobs included in the workflow in order (step S211). When execution of all jobs in the workflow is completed, processing by the workflow execution processing unit 123 ends.

On the other hand, when it is determined that a cloud job is included in the workflow ("YES" in step S209) and that the region ID received from the management device 30 does not match the region ID read from the storage device 110 ("Mismatch" in step S210), the execution control unit 123a repeats steps S232 to S243 for each cloud job included in the workflow (steps S231 to S244).

The following described steps S232 to S243.

The suitability determination unit 123d determines whether or not a cloud service requested by the cloud job can be connected to from the region in which the MFP 10a1 is installed (step S232).

When it is determined that connection to the cloud service requested by the cloud job is not possible from the region in which the MFP 10a1 is installed ("NO" in step S232), the execution control unit 123a presents a service that can be provided as an alternative service (step S233).

The suitability determination unit 123d determines whether or not a usage fee for using the cloud service is the cheapest when connecting to the cloud service requested by the cloud job from the region in which the MFP 10a1 is installed (step S234). If it is determined to not be the cheapest ("NO" in step S234), the execution control unit 123a presents the cheapest alternative service (step S235).

The suitability determination unit 123d determines whether or not communication speed for access is the fastest when connecting to the cloud service requested by the cloud job from the region in which the MFP 10a1 is installed (step S236). If it is determined to not be the fastest ("NO" in step S236), the execution control unit 123a presents the fastest alternative service (step S237).

Next, the service determination unit 123c determines whether or not the cloud service requested by the cloud job in the workflow includes language processing of data (step S238).

When the service determination unit 123c determines that the cloud service requested by the cloud job in the workflow includes language processing of data ("YES" in step S238), the language specification unit 123e specifies a language included in data to be processed in cloud service requested by the cloud job in the workflow (step S239). The suitability determination unit 123d determines whether or not the language specified by the language specification unit 143e can be processed in the cloud service requested by the cloud job (step S240).

When the suitability determination unit 123d determines that the language specified by the language specification unit 123e cannot be processed in the cloud service requested by the cloud job ("NO" in step S240), the execution control unit 123a presents an alternative service that can process the language (step S241).

The execution control unit 123a receives an instruction of whether or not to switch to an alternative service from the operation panel 169. Upon receiving an instruction to switch to an alternative service ("YES" in step S242), the replacement unit 123f replaces the cloud service included in the cloud job in the workflow with the alternative service (step S243).

Upon receiving an instruction to not switch to an alternative service ("NO" in step S242), replacement with the alternative service does not occur.

When steps S232 to S243 are completed for each cloud job included in the workflow, the execution control unit 123a executes the workflow including the replacement alternative service or the workflow without a replacement alternative service (step S245).

This completes workflow execution processing.

Operations of the MFP 10a2, 10a3, 10b1, 10b2, 10b3, 10c1, 10c2, 10c3 are the same as those of the MFP 10a1.

1.10 Other Embodiments

Figure 16:
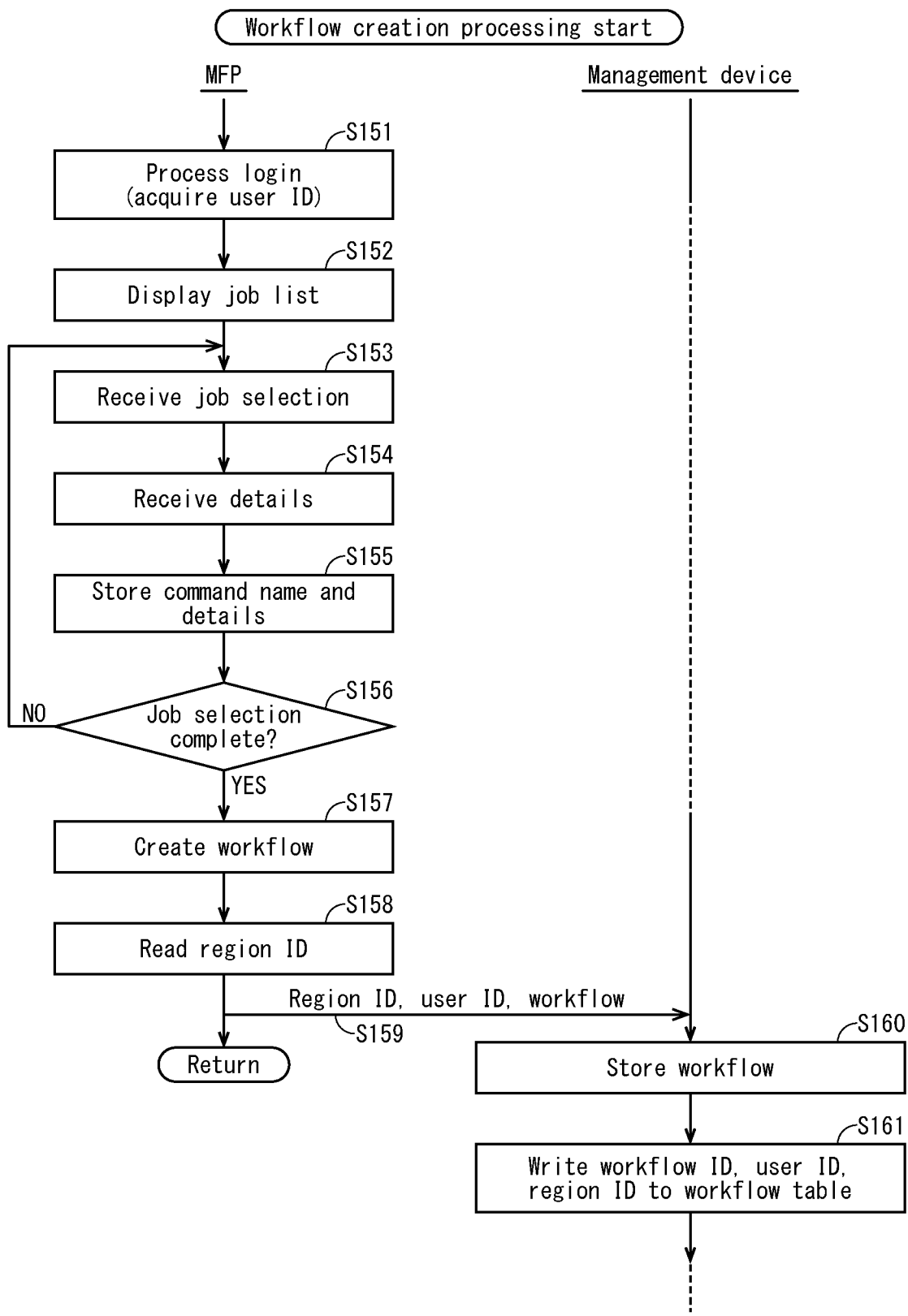
FIG. 16 is a flowchart illustrating operations in workflow creation processing by the MFP 10*a*1 and the management device 30.
Figure 17:
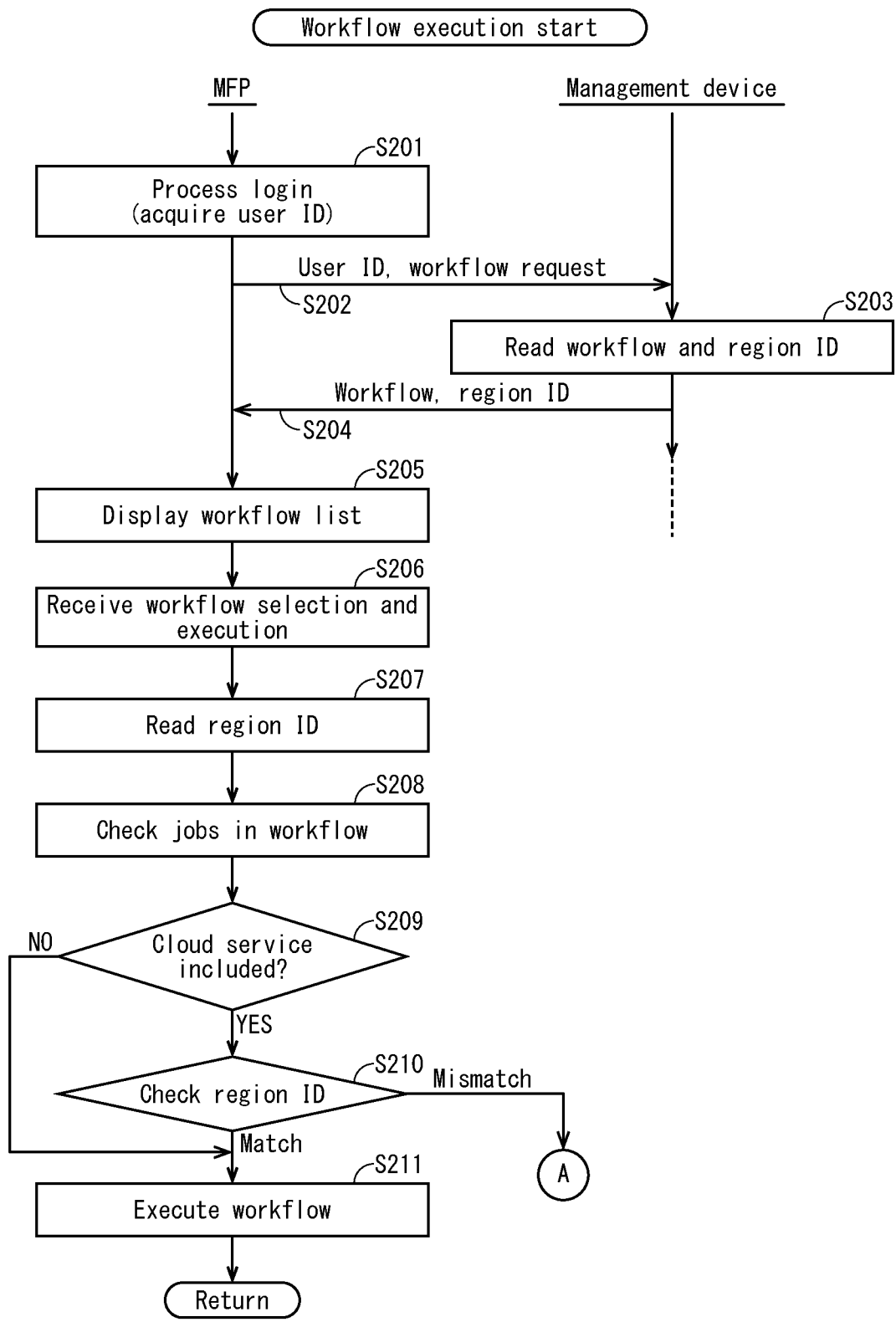
FIG. 17 is a flowchart (1 of 2) illustrating operations in workflow execution by the MFP 10*a*1 and the management device 30, continued in FIG. 18.
Figure 18:
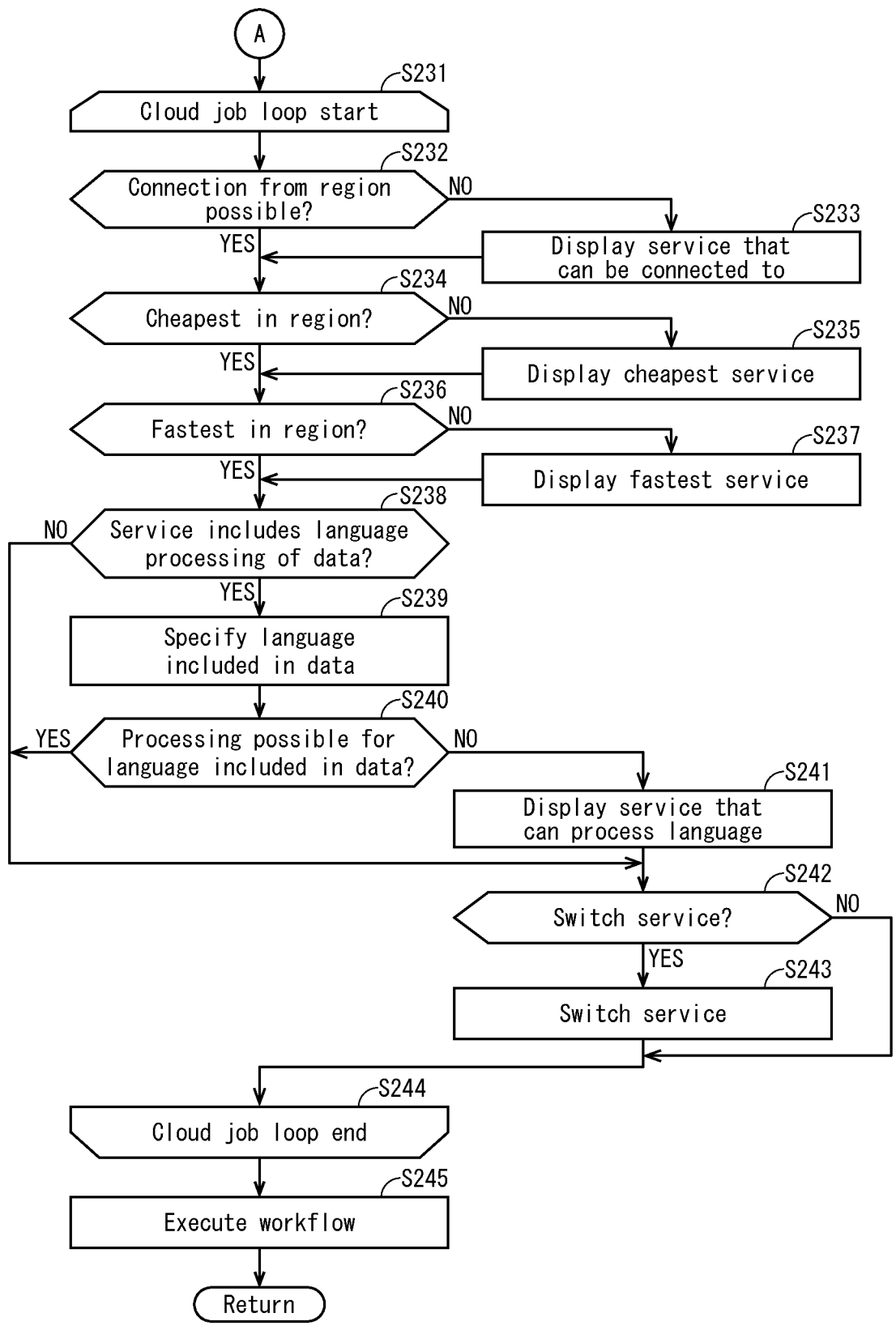
FIG. 18 is a flowchart (2 of 2) illustrating operations in workflow execution by the MFP 10*a*1 and the management device 30.

According to one or more embodiments, the MFP 10a1 installed on the network 1a generates a workflow according to the operations illustrated in FIG. 16, transmits the generated workflow to the management device 30, and the MFP 10a1 executes the workflow according to the operations illustrated in FIG. 17 and FIG. 18.

(1) According to one or more embodiments, the MFP 10a1 installed on the network 1a generates a workflow and transmits the generated workflow to the management device 30 according to the operations illustrated in FIG. 16, and the MFP 10b1 installed on the network 1b acquires the workflow from the management device 30 and executes the workflow according to the operations illustrated in FIG. 17 and FIG. 18.

(2) According to one or more embodiments, the MFP 10b1 installed on the network 1b generates a workflow and transmits the generated workflow to the management device 30 according to the operations illustrated in FIG. 16, and the MFP 10c1 installed on the network 1c acquires the workflow from the management device 30 and executes the workflow according to the operations illustrated in FIG. 17 and FIG. 18.

(3) According to one or more embodiments, the MFP 10c1 installed on the network 1c generates a workflow and transmits the generated workflow to the management device 30 according to the operations illustrated in FIG. 16, and the MFP 10a1 installed on the network 1a acquires the workflow from the management device 30 and executes the workflow according to the operations illustrated in FIG. 17 and FIG. 18.

1.11 Review

According to one or more embodiments, when a workflow that is to be executed includes a cloud job that requests a cloud service, and the first network region in which the device that created the workflow is installed does not match the second network region in which the MFP executing the workflow is installed, and it is determined that implementing the cloud service in the second network region is not appropriate, an alternative service to the cloud service is presented. Thus, an effect is achieved such that even if the first network region and the second network region are different, an appropriate service can be provided in the second network region.

An information processing device according to one or more embodiments is an information processing device that acquires and executes a workflow including interrelated jobs from a management device, the information processing device comprising: a non-transitory memory device that stores instructions; and a hardware processor that executes the instructions and causes the information processing device to operate as: a first determination unit that determines whether a first network region in which a device that generated the workflow is installed matches a second network region in which the information processing device is installed; a second determination unit that determines whether the workflow includes a cloud job, which is a job that requests a service from a server device; a third determination unit that, when the first determination unit determines that the first network region and the second network region do not match and the second determination unit determines that the workflow includes a cloud job, determines whether implementing the service in the second network region is appropriate; and a presentation unit that, when the third determination unit determines that implementing the service is not appropriate, presents an alternative service.

According to one or more embodiments, the information processing device further comprises a receiver that receives selection of the alternative service by a user. The instructions further cause the information processing device to operate as a replacement unit that replaces the cloud job in the workflow with a cloud job that requests the alternative service selected by a user.

According to one or more embodiments, the information processing device further comprises a storage that stores connection availability information indicating whether or not connection is possible from the second network region to the service provided by the server device, and the third determination unit determines whether implementing the service requested by the cloud job is appropriate by using the connection availability information to determine whether or not connection to the service is possible.

According to one or more embodiments, the third determination unit determines that implementing the service is not appropriate upon determining that connection to the service is not possible.

According to one or more embodiments, the alternative service is a service that can be connected to from the second network region.

According to one or more embodiments, the information processing device further comprises a storage that stores usage fees of services that can be connected to from the second network region, and the third determination unit uses the usage fees to determine whether implementing the service requested by the cloud job is appropriate.

According to one or more embodiments, the third determination unit determines that implementing the service is not appropriate when a service is provided in the second network region with a usage fee lower than a usage fee of the service requested by the cloud job.

According to one or more embodiments, the alternative service is a service provided for a lower usage fee than the usage fee of the service requested by the cloud job.

According to one or more embodiments, the information processing device further comprises a storage that stores communication speeds of services that can be connected to from the second network region, and the third determination unit uses the communication speeds to determine whether implementing the service requested by the cloud job is appropriate.

According to one or more embodiments, the third determination unit determines that implementing the service is not appropriate when a service is provided in the second network region with a communication speed faster than a communication speed when accessing the service requested by the cloud job.

According to one or more embodiments, the alternative service is a service provided at a faster communication speed than the communication speed when accessing the service requested by the cloud job.

According to at one or more embodiments, the information processing device further comprises a storage that stores a list of supported languages for services that can be connected to from the second network region. The instructions further cause the information processing device to operate as a language specification unit that specifies a language in data to be processed by the service requested by the cloud job. The services that can be connected to from the second network region include processing related to language, the second determination unit determines whether the service requested by the cloud job provides processing related to language, and the third determination unit, when the service requested by the cloud job includes processing related to language, determines whether implementing the service is appropriate depending on whether the language specified by the language specification unit matches a language stored by the storage.

According to one or more embodiments, the language specification unit specifies the language based on a character string extracted from the data to be processed.

According to one or more embodiments, the third determination unit determines that implementing the service is not appropriate when the language specified by the language specification unit does not match a language stored by the storage.

According to one or more embodiments, the alternative service is a service that supports a language matching the language specified by the language specification unit.

According to one or more embodiments, the presentation unit also presents information about a company providing the alternative service and/or the number of users of the alternative service.

According to one or more embodiments, the information processing device further comprises a receiver that receives input of jobs from a user and a transmitter. The instructions further cause the information processing device to operate as a generation unit that generates a workflow by concatenating the jobs input. The transmitter transmits the workflow to the management device to store the workflow in the management device.

According to one or more embodiments, the receiver receives, for each job, a command name, a command setting condition, and an execution order, the jobs input include a job executed by the information processing device and a job that requests a service from the server device, and the generation unit generates the workflow by arranging the jobs according to the execution order received.

According to one or more embodiments, the receiver receives, for each job, the command name then the command setting condition corresponding to the command name.

According to one or more embodiments, the information processing device further comprises a storage that stores region information. The receiver receives input of region information that indicates the second network region, and the transmitter transmits the region information to the management device to store the region information associated with the workflow in the management device.

According to one or more embodiments, the receiver receives input of a user ID that identifies an authenticated user, and the transmitter transmits the user ID to the management device to store the user ID associated with the workflow in the management device.

According to one or more embodiments, a control method used by an information processing device that acquires and executes a workflow including interrelated jobs from a management device is the control method comprising: determining whether a first network region in which a device that generated the workflow is installed matches a second network region in which the information processing device is installed; determining whether the workflow includes a job that requests a service from a server device; when the first region and the second region do not match and the workflow includes a cloud job, determining whether implementing the service in the second region is appropriate; and when implementing the service is determined to not be appropriate, presenting an alternative service.

2 Other Modifications

The present disclosure has been described above based on embodiments, but are not limited to the embodiments described above.

(1) According to one or more embodiments, the communication system 5 includes an MFP (information processing device) that is a tandem-type color multi-function peripheral having scanning, printing, and copying functions.

However, this is not a limitation.

The communication system 5, instead of or in addition to the MFP, may include a printer (information processing device) that receives a print job from an external device and executes the print job. Further, instead of or in addition to the MFP, the communication system 5 may include a scanner (information processing device) that reads a document, generates image data, and transmits generated image data to an external device.

Further, the communication system 5, instead of or in addition to the MFP, may include a computer system (information processing device). A computer system is typically a personal computer. A computer system includes a CPU, ROM, RAM, a hard disk, a mouse, a keyboard, a display, a communication circuit, and the like. A computer system fulfils functions via the CPU operating according to computer instructions stored in the ROM, the RAM, or the hard disk.

The MFP, printer, scanner, or computer system controls workflow execution from interrelated jobs. The jobs include a job that request a corresponding service from a server device.

(2) According to one or more embodiments, as illustrated in FIG. 17, in step S209, the service determination unit 123c determines whether or not a cloud job that requests a cloud service is included, and on determining that a cloud job that requests a cloud service is included, in step S210, the region determination unit 123b determines whether or not a region ID received from the management device 30 matches a region ID read from the storage device 110.

However, the order of the determinations of step S209 and step S210 is not limited to this example.

According to one or more embodiments, the determination of step S209 occurs after the determination of step S210.

That is, the region determination unit 123b determines whether or not a region ID received from the management device 30 matches a region ID read from the storage device 110. Next, if the received region ID does not match the read region ID, the service determination unit 123c determines whether or not a cloud job requesting a cloud service is included in the workflow.

(3) According to one or more embodiments, the execution control unit 123a of the workflow execution processing unit 123 repeats determinations (a) to (d) for each cloud job included in a workflow:

(a) Determination of whether or not connection to a cloud service is possible;
(b) Determination of usage fee in region;
(c) Determination of communication speed in region;
(d) Determination with language processing.

However, this is not a limitation.

According to one or more embodiments, the execution control unit 123a repeatedly executes at least one of the determinations (a) to (d) for each cloud job included in the workflow.

Further, according to the flowchart illustrated in FIG. 18, the execution control unit 123a executes determinations (a) to (d) in the order illustrated. However, this is not a limitation.

According to one or more embodiments, the execution control unit 123a selects at least one determination item, arranges the selected determination items in any order, and executes the determinations in the arranged order.

(4) Embodiments and modifications described above may be combined.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An information processing device that acquires and executes a workflow including interrelated jobs from a management device, wherein a device that has generated the workflow is installed in a first network region and the information processing device is installed in a second network region, the information processing device comprising:
    a main controller comprising:
        a memory that stores instructions; and
        a central processing unit (CPU) that executes the instructions, wherein
    based on the instructions executed by the CPU, the main controller:
        determines whether the first network region matches the second network region,
        determines whether the workflow includes a first cloud job that requests a service from a server device,
        upon determining that the first network region does not match the second network region and also that the workflow includes the first cloud job, determines whether to implement the service in the second network region, and
        upon determining not to implement the service in the second network region, outputs service information to be displayed as an alternative service; and
    an operation panel that receives the service information from the main controller and displays the alternative service.

2. The information processing device of claim 1, wherein the operation panel receives user input for selecting the alternative service, and
the main controller replaces the first cloud job in the workflow with a second cloud job that requests the selected alternative service.

3. The information processing device of claim 2, further comprising:
a storage that stores connection availability information indicating whether connection is possible from the second network region to the service provided by the server device, wherein
the main controller determines whether to implement the service requested by the first cloud job by determining, using the connection availability information, whether the connection to the service provided by the server device is possible.

4. The information processing device of claim 3, wherein the main controller determines not to implement the service upon determining that the connection to the service provided by the server device is not possible.

5. The information processing device of claim 3, wherein the alternative service is connectable from the second network region.

6. The information processing device of claim 2, further comprising:
a storage that stores usage fees of services that are connectable from the second network region, wherein
the main controller uses the usage fees to determine whether to implement the service requested by the first cloud job.

7. The information processing device of claim 6, wherein the main controller determines not to implement the service when a second usage fee is lower than a first usage fee, wherein another service is provided in the second network region with the second usage fee and the service requested by the first cloud job is provided with the first usage fee.

8. The information processing device of claim 6, wherein the alternative service is provided with a third usage fee lower than a first usage fee of the service requested by the first cloud job.

9. The information processing device of claim 2, further comprising:
a storage that stores communication speeds of services that are connectable from the second network region, wherein
the main controller uses the communication speeds to determine whether to implement the service requested by the first cloud job.

10. The information processing device of claim 9, wherein
the main controller determines not to implement the service when a second communication speed is faster than a first communication speed, wherein another service is provided in the second network region at the second communication speed and the service requested by the first cloud job is accessed at the first communication speed.

11. The information processing device of claim 9, wherein the alternative service is provided at a third communication speed faster than a first communication speed of accessing the service requested by the first cloud job.

12. The information processing device of claim 2, further comprising:
a storage that stores a list of supported languages for services that are connectable from the second network region, wherein
the main controller specifies a first language in data processed by the service requested by the first cloud job,
the services that are connectable from the second network region include processing related to the first language,
the main controller further:
determines whether the service requested by the first cloud job provides the processing related to the first language, and
upon determining that the service requested by the first cloud job provides the processing related to the first language, determines whether to implement the service based on whether the first language matches a second language stored in the storage.

13. The information processing device of claim 12, wherein the main controller specifies the first language based on a character string extracted from the data.

14. The information processing device of claim 12, wherein the main controller determines not to implement the service when the first language does not match the second language.

15. The information processing device of claim 12, wherein the alternative service supports the first language.

16. The information processing device of claim 1, wherein the operation panel displays information about a company providing at least one of the alternative service and a number of users of the alternative service.

17. The information processing device of claim 1, further comprising:
a transmitter, wherein
the operation panel receives input of jobs by a user,
the main controller generates a separate workflow by concatenating the jobs, and
the transmitter transmits the separate workflow to the management device.

18. The information processing device of claim 17, wherein
the operation panel receives, for each of the jobs, a command name, a command setting condition, and an execution order,
the jobs include a job executed by the information processing device and the first cloud job that requests the service from the server device, and
the main controller generates the separate workflow by arranging the jobs based on the execution order.

19. The information processing device of claim 18, wherein the operation panel receives, for each of the jobs, the command name and the command setting condition corresponding to the command name.

20. The information processing device of claim 17, further comprising:
a storage that stores region information, wherein
the operation panel receives input of region information indicating the second network region, and
the transmitter transmits the region information to the management device that stores the region information to be associated with the workflow.

21. The information processing device of claim 17, wherein
the operation panel receives input of a user identifier (ID) that identifies an authenticated user, and
the transmitter transmits the user ID to the management device that stores the user ID to be associated with the workflow.

22. A control method used by an information processing device that acquires and executes a workflow including interrelated jobs from a management device, wherein a device that has generated the workflow is installed in a first network region and the information processing device is installed in a second network region, the control method comprising:
determining whether the first network region matches the second network region;
determining whether the workflow includes a first cloud job that requests a service from a server device;
upon determining that the first network region does not match the second network region and also that the workflow includes the first cloud job, determining whether to implement the service in the second network region;
upon determining not to implement the service in the second network region, outputting service information to be displayed as an alternative service; and
receiving the service information and displaying the alternative service.

* * * * *